United States Patent
Yamazaki

(10) Patent No.: US 8,392,068 B2
(45) Date of Patent: Mar. 5, 2013

(54) VEHICLE BEHAVIOR CONTROL DEVICE

(75) Inventor: Ippei Yamazaki, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/576,851

(22) PCT Filed: Feb. 2, 2010

(86) PCT No.: PCT/JP2010/051739
§ 371 (c)(1),
(2), (4) Date: Sep. 17, 2012

(87) PCT Pub. No.: WO2011/096072
PCT Pub. Date: Aug. 11, 2011

(65) Prior Publication Data
US 2013/0006476 A1    Jan. 3, 2013

(51) Int. Cl.
*A01B 69/00* (2006.01)

(52) U.S. Cl. ........... 701/42; 701/41; 701/69; 701/70; 701/89; 180/6.2; 180/233; 180/234; 180/242; 180/410; 303/20; 303/121; 280/5.507; 280/5.51; 280/5.513

(58) Field of Classification Search ............... 701/41, 701/42, 69, 70, 81, 89; 180/233, 234, 6.2, 180/242, 410; 303/20.1, 121; 280/5.507, 280/5.51, 5.513
See application file for complete search history.

(56) References Cited

U.S. PATENT DOCUMENTS 7,440,834 B2 * 10/2008 Yamaguchi et al. ............ 701/69
7,698,034 B2 * 4/2010 Ghoneim .................... 701/41
7,885,742 B2 * 2/2011 Yamazaki .................... 701/41
2007/0185638 A1 * 8/2007 Odenthal et al. ............. 701/70

FOREIGN PATENT DOCUMENTS

JP    63 279976    11/1988
(Continued)

OTHER PUBLICATIONS

International Search Report Issued Jun. 15, 2010 in PCT/JP10/51739 Filed Feb. 2, 2010.

*Primary Examiner* — Redhwan k Mawari
(74) *Attorney, Agent, or Firm* — Oblon, Spivak, McClelland, Maier & Neustadt, L.L.P.

(57) ABSTRACT

A vehicle behavior control device (S) determines, by using a vehicle velocity (V), a transmission function (K(s)) which is determined based on a specification of the vehicle, receives as an input a wheel turning speed ($\omega$) obtained by differentiating a wheel turning angle ($\delta$) of left and right front wheels (FW1, FW2) with respect to time, and outputs a target yaw moment ($M_y$). The device (S) also calculates, by using the determined target yaw moment ($M_y$), a left-wheel-side forward/backward force ($F_{xCL}$) imparted to a left wheel side (left front wheel FW1 and left rear wheel RW1) of a vehicle (10) and a right-wheel-side forward/backward force ($F_{xCR}$) imparted to a right wheel side (right front wheel FW2 and right rear wheel RW2) of the vehicle (10). Then, the device (S) performs control to drive brake units (14-17) and in-wheel motors (IWMfl, IWMfr, IWMrl, IWMrr) depending on a turning direction of the vehicle (10), with the left-wheel-side forward/backward force ($F_{xCL}$) serving as a braking force (or driving force) and the right-wheel-side forward/backward force ($F_{xCR}$) serving as a driving force (or braking force). It is thus possible to ensure directional stability and responsiveness when the vehicle turns, taking into account a frequency response characteristic of a motion state amount generated on the vehicle (10).

10 Claims, 12 Drawing Sheets

FOREIGN PATENT DOCUMENTS

| | | |
|---|---|---|
| JP | 2001 225733 | 8/2001 |
| JP | 2005 255035 | 9/2005 |
| JP | 2006 282064 | 10/2006 |
| JP | 2007 30848 | 2/2007 |
| JP | 2008 506587 | 3/2008 |
| JP | 2008 74185 | 4/2008 |

* cited by examiner

VEHICLE BEHAVIOR CONTROL DEVICE

TECHNICAL FIELD

The present invention relates to a vehicle behavior control device, and more particularly, to a vehicle behavior control device for securing, by taking into account frequency response characteristics of a motion state amount generated on a vehicle, directional stability and responsiveness during a turn of a vehicle.

BACKGROUND ART

Conventionally, proposals for improving directional stability and responsiveness during a turn of a vehicle have been made. For example, Japanese Patent Application Laid-Open (kokai) No. S63-279976 describes a vehicle steering device for determining a hydraulic pressure control value, which increases as a front wheel steering angle increases, and decreases as the vehicle speed increases, and applying a brake hydraulic pressure corresponding to the determined hydraulic pressure control value to a brake device on a steering direction side of front wheels of a pair of left and right brake devices applying braking forces to rear wheels. Then, in this conventional vehicle steering device, the brake device on the steering direction side of the front wheels imparts a braking force to a rear wheel on the steering direction side, the brake force can generate a moment toward the steering direction of the front wheel on a body, and satisfactory head turn property and responsiveness of the vehicle are obtained.

DISCLOSURE OF THE INVENTION

However, a motion state amount (such as the yaw rate or lateral acceleration) generated by a vehicle during a turn of the vehicle has frequency response characteristics to a periodic turn of the wheels to be turned, and it is known that the frequency response characteristics change according to the vehicle speed of the vehicle. Then, the change in frequency response characteristics affects the directional stability and responsiveness during the turn of the vehicle.

Regarding this point, in the above-mentioned conventional vehicle steering device, based on the steering angle of the front wheels, and the vehicle speed, the brake device of the front wheel on the steering direction side imparts a braking force, thereby generating a moment toward the steering direction. In this case, unless, corresponding to the periodic turn of the wheels to be turned, the braking force is properly imparted, a moment toward the steering direction of the front wheels generated on the vehicle, namely, a yaw moment cannot be generated properly in response to a frequency response characteristic of the motion state amount. As a result, the directional stability of the vehicle may be deteriorated, or a driver may feel a sensitive or insensitive responsiveness, and may feel a sense of discomfort.

Thus, regarding the directional stability and responsiveness during the turn of the vehicle, in order to prevent the driver from feeling the sense of discomfort, it is necessary to take into account the frequency response characteristics of the motion state amount generated on the vehicle to the periodic turn of the wheels to be turned.

The present invention has been made to solve the above-mentioned problem, and has an object to provide a vehicle behavior control device capable of providing satisfactory directional stability and responsiveness during the turn of the vehicle, taking into account a frequency response characteristic of a motion state amount generated on a vehicle.

In order to achieve the above-mentioned object, a feature of the present invention resides in a vehicle behavior control device for controlling a behavior during a turn of a vehicle including a steering wheel operated by a driver for steering the vehicle and wheel turning means for turning a wheel to be turned in accordance with the operation of the steering wheel, the vehicle behavior control device including: wheel turning speed detection means for detecting a wheel turning speed of the wheel to be turned by the wheel turning means; vehicle speed detection means for detecting a vehicle speed of the vehicle; transfer function determination means for determining, by using the vehicle speed detected by the vehicle speed detection means, a transfer function which is determined based on a specification of the vehicle, receives the wheel turning speed of the wheel to be turned as an input, and outputs a yaw moment for making constant a frequency response characteristic of a motion state amount generated on the vehicle by the turning of the wheel to be turned by the wheel turning means in response to a periodic turn of the wheel to be turned; target yaw moment calculation means for calculating, by using the transfer function determined by the transfer function determination means and the wheel turning speed detected by the wheel turning speed detection means, a target yaw moment to be generated in a wheel turning direction of the wheel to be turned; forward/backward force calculation means for calculating, by using the target yaw moment calculated by the target yaw moment calculation means, a left-wheel-side forward/backward force to be generated on a left wheel side of front/rear left/right wheels of the vehicle, and a right-wheel-side forward/backward force to be generated on a right wheel side of the front/rear left/right wheels of the vehicle; and forward/backward force imparting means for imparting the left-wheel-side forward/backward force calculated by the forward/backward force calculation means to the left wheel side of the vehicle, and imparting the right-wheel-side forward/backward force calculated by the forward/backward force calculation means to the right wheel side of the vehicle. In this case, the forward/backward force imparting means may include: braking force imparting means for imparting a braking force to each of the front/rear left/right wheels of the vehicle; and driving force imparting means for imparting a driving force to the each of the front/rear left/right wheels of the vehicle. Further, in this case, the frequency response characteristic in response to the periodic turn of the wheel to be turned may include, for example, response characteristics of a gain and a phase of the motion state amount generated on the vehicle in response to a frequency change of an amount of turn of the wheel to be turned. Further, the motion state amount generated on the vehicle may be, for example, a yaw rate of the vehicle or a lateral acceleration of the vehicle.

Further, in this case, the forward/backward force calculation means may calculate, as a braking force, depending on the wheel turning direction of the wheel to be turned by the wheel turning means, the left-wheel-side forward/backward force or the right-wheel-side forward/backward force corresponding to a turning-inner-wheel side of the vehicle in a turning state, and may calculate, as a driving force, the right-wheel-side forward/backward force or the left-wheel-side forward/backward force corresponding to a turning-outer-wheel side of the vehicle in the turning state, and the forward/backward force imparting means may impart the braking force or the driving force to the left wheel side, and imparts the driving force or the braking force to the right wheel side. In this case, the forward/backward force imparting means may impart the braking force or the driving force to a rear wheel on the left wheel side, or may impart the driving force or the braking force to a rear wheel on the right wheel side.

Further, the forward/backward force calculation means may calculate, as a braking force, depending on the wheel turning direction of the wheel to be turned by the wheel turning means, the left-wheel-side forward/backward force or the right-wheel-side forward/backward force corresponding to a turning-inner-wheel side of the vehicle in a turning state, and the forward/backward force imparting means may impart the braking force to the left wheel side or the right wheel side corresponding to the turning-inner-wheel side of the vehicle. Further, the forward/backward force calculation means may calculate, as a driving force, depending on the wheel turning direction of the wheel to be turned by the wheel turning means, the right-wheel-side forward/backward force or the left-wheel-side forward/backward force corresponding to the turning-outer-wheel side of the vehicle in a turning state, and the forward/backward force imparting means may impart the driving force to the right wheel side or the left wheel side corresponding to the turning-outer-wheel side of the vehicle.

According to the above-mentioned configuration, the transfer function determination means can determine the transfer function which is determined based on specifications of the vehicle (vehicle model), receives the wheel turning speed of the wheels to be turned as an input, and outputs a yaw moment for making constant frequency response characteristics of the motion state amount (such as a yaw rate and lateral acceleration) generated on the vehicle. Moreover, the target yaw moment calculation means can calculate the target yaw moment by using the set transfer function and the wheel turning speed detected by the wheel turning speed detection means (more specifically, multiplying the set transfer function and the steering speed by each other). As a result, the target yaw moment is calculated reflecting the change in the motion state amount generated on the vehicle by the steering of the wheels to be turned, namely, reflecting (taking into account) the frequency response characteristics. Moreover, the forward/backward force calculation means can calculate, by using the target yaw moment calculated in this way, depending on the turn direction of the vehicle, the left-wheel-side forward/backward force (braking force or driving force) generated on the left wheel side of the front/rear left/right wheels of the vehicle, and the right-wheel-side forward/backward force (driving force or braking force) generated on the right wheel side of the front/rear left/right wheels of the vehicle. Then, the forward/backward force imparting means can impart the left-wheel-side forward/backward force (braking force or driving force) and the right-wheel-side forward/backward force (driving force or braking force) calculated by the forward/backward force calculation means respectively to the left wheel side (left front/rear wheels or left rear wheel) and the right wheel side (right front/rear wheels or right rear wheel).

As a result, in the turning vehicle to which the left-wheel-side forward/backward force and the right-wheel-side forward/backward force calculated properly by the forward/backward force calculation means for generating the target yaw moment calculated by the target yaw moment calculation means are imparted, the influence on directional stability and responsiveness caused by a change in the frequency response characteristic of the motion state amount generated on the vehicle can be reduced. Thus, satisfactory directional stability and responsiveness during the turn of the vehicle are obtained, and, regarding the change in motion state amount generated on the vehicle, the sense of discomfort felt by a driver can be significantly restrained.

The calculated target yaw moment makes constant the response characteristics of the gain and the phase of the motion state amount generated on the vehicle in response to the frequency change of the amount of turn of the wheels to be turned. As a result, the change in the frequency response characteristics of the motion state amount generated on the vehicle, specifically, the change in response characteristics of the gain and the phase of the motion state amount generated on the vehicle can be significantly restrained. In other words, by imparting the left-wheel-side forward/backward force and the right-wheel-side forward/backward force so that the target yaw moment is generated, the frequency response characteristics of the motion state amount generated on the vehicle can be set approximately constant, and the directional stability and the responsiveness can be maintained extremely properly. Thus, satisfactory directional stability and responsiveness during the turn of the vehicle are obtained, and, regarding the change in motion state amount generated on the vehicle, the sense of discomfort felt by a driver can be more significantly restrained.

Moreover, the transfer function determination means can determine the transfer function by using the vehicle speed detected by the vehicle speed detection means. As a result, the transfer function determination means can set the transfer function also taking into account the frequency response characteristics of the motion state amount of the vehicle changing in accordance with the vehicle speed, and hence the target yaw moment calculated by using the transfer function is calculated so as to properly improve the directional stability and the responsiveness of the vehicle which change in accordance with the vehicle speed. Thus, satisfactory directional stability and responsiveness during the turn of the vehicle are obtained, and, regarding the change in the motion state amount generated on the vehicle, the sense of discomfort felt by a driver can be more significantly restrained.

Further, the forward/backward force imparting means can impart a braking force or a driving force to the rear wheel on the left wheel side, or impart a driving force or a braking force to the rear wheel on the right wheel side. As a result, on the vehicle in the turning state, a force restraining a body lift of a rear portion of the vehicle on the inner side of the turn, or a body dive of the rear portion of the vehicle on the outer side of the turn, namely, a roll behavior generated on the vehicle in the turning state can be actively generated by a suspension structure (so-called anti-lift geometry structure). As a result, even the roll behavior of the vehicle in the turning state can be efficiently restrained.

Further, another feature of the present invention resides in that, in a state in which the vehicle in a turning state is decelerating by a decelerating braking force imparted to the front/rear left/right wheels, when the decelerating braking force imparted to the right wheel side or the left wheel side corresponding to a turning-outer-wheel side of the vehicle in the turning state is smaller than the right-wheel-side forward/backward force or the left-wheel-side forward/backward force corresponding to the turning-outer-wheel side of the vehicle in the turning state for generating the target yaw moment calculated by the target yaw moment calculation means, the forward/backward force calculation means adds a difference between the deceleration braking force and the right-wheel-side forward/backward force or the left-wheel-side forward/backward force corresponding to the turning-outer-wheel side of the vehicle to the left-wheel-side forward/backward force or the right-wheel-side forward/backward force corresponding to a turning-inner-wheel side of the vehicle in the turning state to calculate a sum as a final left-wheel-side forward/backward force or right-wheel-side forward/backward force corresponding to the turning-inner-wheel side of the vehicle. In this case, for example, the forward/backward force calculation means may calculate the final right-wheel-side forward/backward force or left-wheel-side forward/backward force corresponding to the turning-outer-wheel side of the vehicle as "0".

Further, in this case, the vehicle behavior control device may further include operation direction detection means for detecting an operation direction of the steering wheel operated by the driver, and the forward/backward force calculation means may calculates, when a generated direction of a motion state amount generated on the vehicle correspondingly to the operation direction of the steering wheel detected by the operation direction detection means and a generated direction of a motion state amount generated on the vehicle by the left-wheel-side forward/backward force and the right-wheel-side forward/backward force are different from each other, the left-wheel-side forward/backward force and the right-wheel-side forward/backward force as "0". In this case, more specifically, the target yaw moment calculation means may set, when the operation direction of the steering wheel detected by the operation direction detection means and a generated direction of the calculated target yaw moment are different from each other, the calculated target yaw moment to "0", and the forward/backward force calculation means may calculate, by using the target yaw moment set to "0" by the target yaw moment calculation means, the left-wheel-side forward/backward force and the right-wheel-side forward/backward force as "0".

As a result, in a state in which the vehicle is decelerating, without using a driving force, namely, only by imparting a braking force, the left-wheel-side forward/backward force and the right-wheel-side forward/backward force for generating the target yaw moment can be generated on the left-side wheels and the right-wheel-side, respectively. More specifically, in a state in which only a braking force is imparted, when the right-wheel-side forward/backward force or the left-wheel-side forward/backward force corresponding to the turning-outer-wheel side of the vehicle required for generating the target yaw moment is insufficient, the forward/backward force calculation means can add a difference (insufficient amount) between the deceleration braking force and the right-wheel-side forward/backward force or the left-wheel-side forward/backward force to the left-wheel-side forward/backward force or right-wheel-side forward/backward force corresponding to the turning-inner-wheel side of the vehicle to calculate a final left-wheel-side forward/backward force or right-wheel-side forward/backward force corresponding to the turning-inner-wheel side. In this case, the forward/backward force calculation means can calculate the final right-wheel-side forward/backward force or left-wheel-side forward/backward force corresponding to the turning-outer-wheel side (braking force) as "0".

Then, the forward/backward force imparting means can generate the target yaw moment by imparting the calculated final left-wheel-side forward/backward force or right-wheel-side forward/backward force (namely, braking force) corresponding to the turning-inner-wheel side. As a result, in the state in which only the braking force is imparted, the influence on the directional stability and the responsiveness caused by changes in frequency response characteristics of the motion state amount generated on the vehicle can be reduced. Thus, satisfactory directional stability and responsiveness during the vehicle turn are obtained, and, regarding the change in motion state amount generated on the vehicle, the sense of discomfort felt by a driver can be significantly restrained.

Moreover, the forward/backward force calculation means can calculate, when the generated direction of the motion state amount generated on the vehicle depending on the operation direction of the steering wheel by the driver and the generated direction of the motion state amount generated on the vehicle by the left-wheel-side forward/backward force and the right-wheel-side forward/backward force are different from each other, namely, the operation direction of the steering wheel by the driver and the generated direction of the target yaw moment (more specifically, the wheel turning direction of the wheel to be turned) are different from each other, the left-wheel-side forward/backward force or the right-wheel-side forward/backward force as "0". As a result, the sense of discomfort between the motion state amount expected to be generated by the operation of the steering wheel by the driver and the motion state amount (more specifically, the target yaw moment) actually generated on the vehicle can be efficiently restrained.

BEST MODE FOR CARRYING OUT THE INVENTION a. First Embodiment

Figure 1:
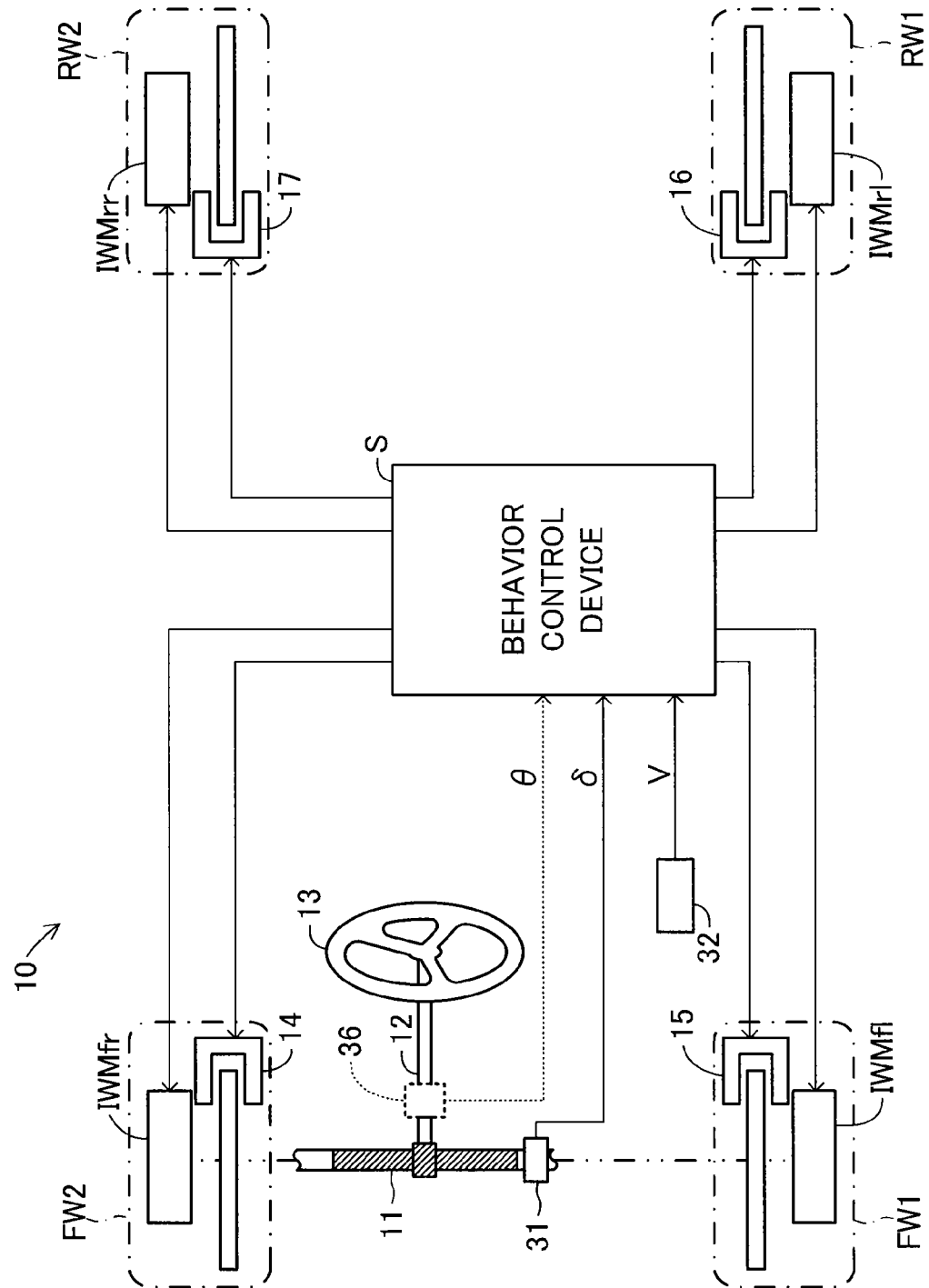
FIG. 1 A schematic diagram illustrating a configuration of a vehicle carrying a vehicle behavior control device common to the first and second embodiments of the present invention.

Hereinafter, a detailed description is given of a vehicle behavior control device according to an embodiment of the present invention referring to drawings. FIG. 1 schematically illustrates a configuration of a vehicle 10 to which a behavior control device S according to the embodiment of the present invention is applied.

The vehicle 10 includes left and right front wheels FW1 and FW2, and left and right rear wheels RW1 and RW2. As wheels to be turned, the left and right front wheels FW1 and FW2 are connected, through the intermediation of well-known wheel turning mechanism 11 (such as a rack-and-pinion mechanism) and a steering shaft 12, to a steering wheel 13 operated for turning by a driver. Moreover, as illustrated in FIG. 1, to the left and right front wheels FW1 and FW2 and the left and right rear wheels RW1 and RW2, in-wheel motors IWMfl, IWMfr, IWMrl, and IWMrr are respectively assembled. The in-wheel motors IWMfl, IWMfr, IWMrl, and IWMrr are three-phase DC motors, for example, and impart driving forces to the left and right front wheels FW1 and FW2 and the left and right rear wheels RW1 and RW2.

Note that, regarding the driving forces imparted to the left and right front wheels FW1 and FW2 and the left and right rear wheels RW1 and RW2, driving forces by an engine (not shown) may be imparted in addition to or in place of the in-wheel motors IWMfl, IWMfr, IWMrl, and IWMrr. In this case, the driving forces from the engine may be imparted, for example, via differential gears on which well-known driving force distribution mechanisms are provided, to the left and right front wheels FW1 and FW2 and the left and right rear wheels RW1 and RW2.

Moreover, the vehicle 10 includes brake units 14 to 17 for imparting braking forces respectively to the left and right front wheels FW1 and FW2 and the left and right rear wheels RW1 and RW2. The brake units 14 to 17 are disk brake units generating the braking forces by friction by pressing, against brake disks integrally rotating with the left and right front wheels FW1 and FW2 and the left and right rear wheels RW1 and RW2, brake pads fixed to calipers including wheel cylinders Wfr, Wfl, Wrl, and Wrr fixed to a front axle and a rear axle, for example.

Figure 2:
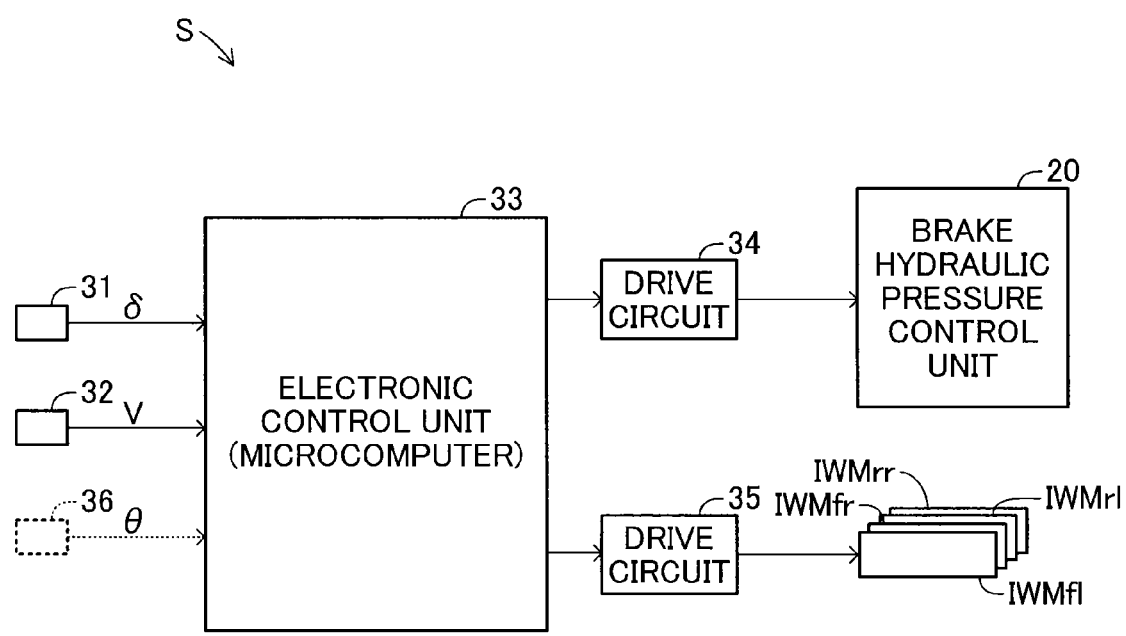
FIG. 2 A schematic diagram illustrating a configuration of the vehicle behavior control device in FIG. 1.

Next, a detailed description is given of the behavior control device S. As illustrated in FIG. 2, the behavior control device S includes a brake hydraulic pressure control unit 20 for controlling brake hydraulic pressures fed to the brake units 14 to 17 (specifically, the wheel cylinders Wfr, Wfl, Wrl, and Wrr).

Figure 3:
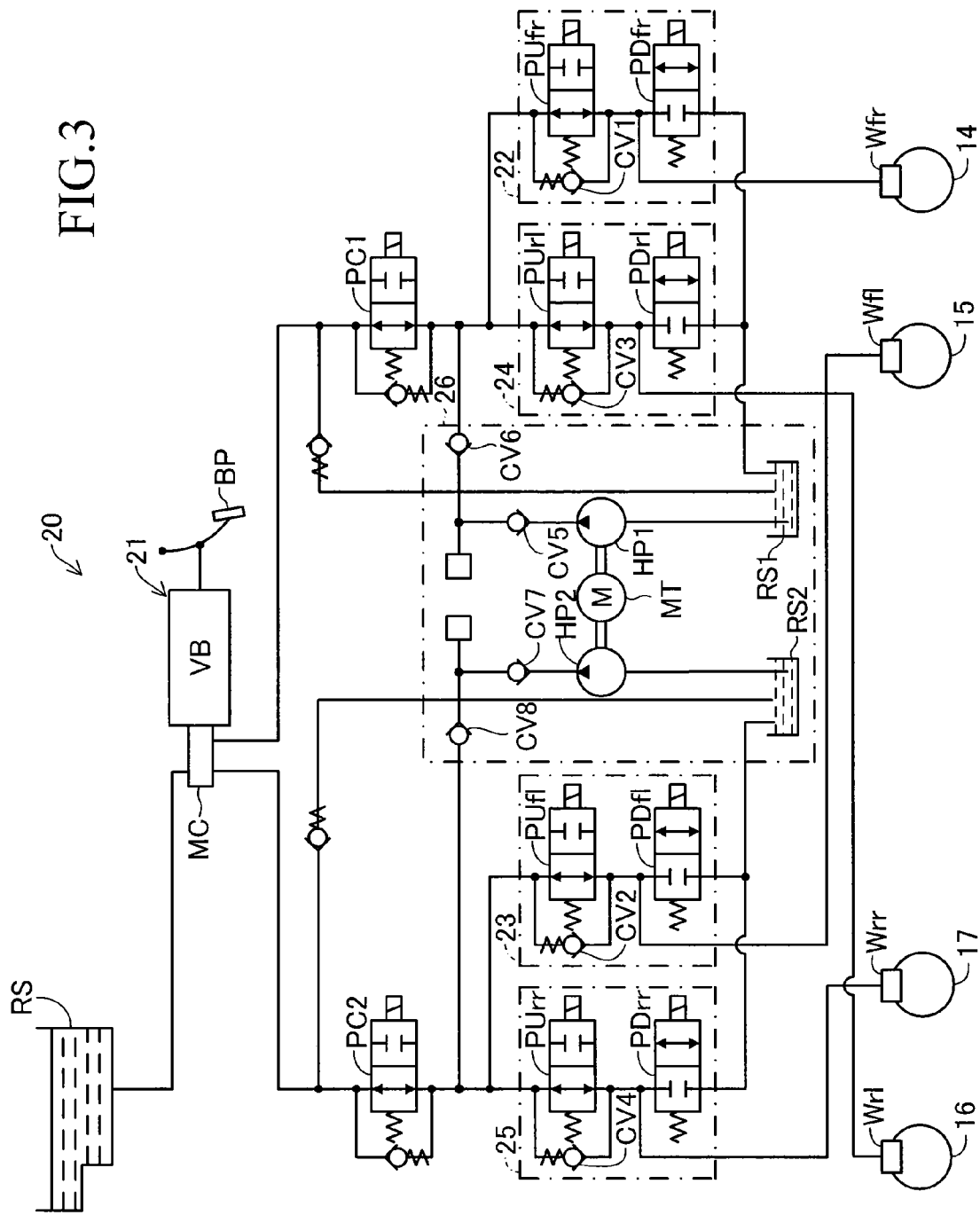
FIG. 3 A schematic diagram illustrating a configuration of a brake hydraulic pressure control unit in FIG. 2.

The brake hydraulic pressure control unit 20 having a schematic configuration illustrated in FIG. 3 includes a brake hydraulic pressure generation unit 21 for generating a brake hydraulic pressure according to an operation force of a brake pedal BP, and an FR brake hydraulic pressure adjustment unit 22, an FL brake hydraulic pressure adjustment unit 23, an RL brake hydraulic pressure adjustment unit 24, and an RR brake hydraulic pressure adjustment unit 25 capable of respectively adjusting the brake hydraulic pressures fed to the wheel cylinders Wfr, Wfl, Wrl, and Wrr operating the calipers of the brake units 14 to 17, and a back-flow brake fluid feed unit 26.

The brake hydraulic pressure generation unit 21 is formed of a vacuum booster VB acting in response to an operation of the brake pedal BP, and a master cylinder MC coupled to the vacuum booster VB. The vacuum booster VB assists, by using an air pressure (negative pressure) in an intake pipe of an engine (not shown) the operation force of the brake pedal BP at a predetermined ratio, and transmits the assisted operation force to the master cylinder MC.

The master cylinder MC includes two systems of output ports including a first port and a second port, and receives a supply of the brake fluid from a reservoir RS, thereby generating a first master cylinder hydraulic pressure from the first port according to the assisted operation force. Moreover, the master cylinder MC generates a second master cylinder hydraulic pressure, which is substantially the same hydraulic pressure as the first master cylinder hydraulic pressure, from the second port.

On this occasion, the first port of the master cylinder MC is connected, through the intermediation of a liner control valve PC1, respectively to an upstream portion of the FR brake hydraulic pressure adjustment unit 22 and an upstream portion of the RL brake hydraulic pressure adjustment unit 24, and the first master cylinder hydraulic pressure is fed respectively to the upstream portions of the FR brake hydraulic pressure adjustment unit 22 and the RL brake hydraulic pressure adjustment unit 24. Similarly, the second port of the master cylinder MC is connected, through the intermediation of a liner control valve PC2 respectively to an upstream portion of the FL brake hydraulic pressure adjustment unit 23 and an upstream portion of the RR brake hydraulic pressure adjustment unit 25, and the second master cylinder hydraulic pressure is fed respectively to the upstream portions of the FL brake hydraulic pressure adjustment unit 23 and the RR brake hydraulic pressure adjustment unit 25.

As illustrated in FIG. 3, the liner control valve PC1 is a 2-port 2-position normally-open electromagnetic selector valve. Then, the linear control valve PC1, when in a first position (position in a non-excited state) illustrated in FIG. 3, communicates the master cylinder MC to the upstream portion of the FR brake hydraulic pressure adjustment unit 22 and the upstream portion of the RL brake hydraulic pressure adjustment unit 24 with each other, and, when in a second position (position in an excited state), shuts off the communication of the master cylinder MC with the upstream portion of the FR brake hydraulic pressure adjustment unit 22 and the upstream portion of the RL brake hydraulic pressure adjustment unit 24. Note that, on the linear control valve PC1, a check valve for permitting the brake fluid to flow from the master cylinder MC side to the upstream portion of the FR brake hydraulic pressure adjustment unit 22 and the upstream portion of the RL brake hydraulic pressure adjustment unit 24 only in one direction is provided. As a result, there is provided a configuration in which, even if the linear control valve PC 1 is in the second position, when the first master cylinder hydraulic pressure is increased to a predetermined hydraulic pressure or more by the operation of the brake pedal BP, the first master cylinder hydraulic pressure is fed to the upstream portion of the FR brake hydraulic pressure adjustment unit 22 and the upstream portion of the RL brake hydraulic pressure adjustment unit 24.

As illustrated in FIG. 3, the liner control valve PC2 is a 2-port 2-position normally-open electromagnetic selector valve. Then, the linear control valve PC2, when in a first position (position in a non-excited state) illustrated in FIG. 3, communicates the master cylinder MC to the upstream portion of the FL brake hydraulic pressure adjustment unit 23 and the upstream portion of the RR brake hydraulic pressure adjustment unit 25 with each other, and, when in a second position (position in an excited state), shuts off the communication of the master cylinder MC with the upstream portion of the FL brake hydraulic pressure adjustment unit 23 and the upstream portion of the RR brake hydraulic pressure adjustment unit 25. Note that, on the linear control valve PC2, a check valve for permitting the brake fluid to flow from the master cylinder MC side to the upstream portion of the FL brake hydraulic pressure adjustment unit 23 and the upstream portion of the RR brake hydraulic pressure adjustment unit 25 only in one direction is provided. As a result, there is provided a configuration in which, even if the linear control valve PC 2 is in the second position, when the second master cylinder hydraulic pressure is increased to a predetermined hydraulic pressure or more by the operation of the brake pedal BP, the second master cylinder hydraulic pressure is fed to the upstream portion of the FR brake hydraulic pressure adjustment unit 22 and the upstream portion of the RR brake hydraulic pressure adjustment unit 25.

The FR brake hydraulic pressure adjustment unit 22 is formed of a pressure increasing valve PUfr, which is a 2-port 2-position normally-open electromagnetic selector valve, and a pressure reducing valve PDfr, which is a 2-port 2-position normally-closed electromagnetic selector valve. The pressure increasing valve PUfr, when in a first position (position in a non-excited state) illustrated in FIG. 3, communicates the upstream portion of the FR brake hydraulic pressure adjustment unit 22 and the wheel cylinder Wfr with each other, and, when in a second position (position in an excited state), shuts off the communication between the upstream portion of the FR brake hydraulic pressure adjustment unit 22 and the wheel cylinder Wfr. The pressure reducing valve PDfr, when in a first position (position in a non-excited state) illustrated in FIG. 3, shuts off the communication between the wheel cylinder Wfr and a reservoir RS1, and, when in a second position (position in an excited state), communicates the wheel cylinder Wfr and the reservoir RS1 with each other.

As a result, when both the pressure increasing valve PUfr and the pressure reducing value PDfr are in the first positions, the feed of the brake fluid in the upstream portion of the FR brake hydraulic pressure adjustment unit 22 to the wheel cylinder Wfr increases the brake hydraulic pressure in the wheel cylinder Wfr. Moreover, when the pressure increasing valve PUfr is in the second position, and the pressure reducing valve PDfr is in the first position, regardless of the brake hydraulic pressure in the upstream portion of the FR brake hydraulic pressure adjustment unit 22, the brake hydraulic pressure in the wheel cylinder Wfr is maintained. Further, when both the pressure increasing valve PUfr and the pressure reducing valve PDfr are in the second positions, the back-flow of the brake fluid in the wheel cylinder Wfr to the reservoir RS1 reduces the brake hydraulic pressure in the wheel cylinder Wfr.

Moreover, a check valve CV1 is provided on the pressure increasing valve PUfr. The check valve CV1 is configured to permit the brake fluid to flow only in one direction from the wheel cylinder Wfr side to the FR brake hydraulic pressure adjustment unit 22. Thus, when the operation force (tread force) applied to the brake pedal BP decreases, the behavior of the check valve CV1 quickly reduces the brake hydraulic pressure in the wheel cylinder Wfr.

Similarly, the upstream portions of the FL brake hydraulic pressure adjustment unit 23, the RL brake hydraulic pressure adjustment unit 24, and the RR brake hydraulic pressure adjustment unit 25 are respectively formed of the pressure increasing valve PUfl and the pressure reducing valve PDfl, the pressure increasing valve PUrl and the pressure reducing valve PDrl, and the pressure increasing valve PUrr and the pressure reducing valve PDrr, and the control of the positions of the respective pressure increasing valves and the respective pressure reducing valves as described above increases, maintains, and reduces the brake hydraulic pressures of the respective wheel cylinder Wfl, the wheel cylinder Wrl, and the wheel cylinders Wrr. Moreover, for the respective pressure increasing valves PUrl, PDrl, and PDrr, check valves CV2, CV3, and CV4 having the same function as the check valve CV1 are respectively provided in parallel with the respective pressure increasing valves.

The back-flow brake fluid feed unit 26 includes a DC motor MT and two hydraulic pressure pumps HP1 and HP2 simultaneously driven by the motor MT. The hydraulic pressure pump HP1 draws the brake fluid in the reservoir RS1 flowing back respectively from the pressure reducing valves PDfr and PDrl, and feeds the drawn (pressurized) brake fluid via check valves CV5 and CV6 respectively to the upstream portion of the FR brake hydraulic pressure adjustment unit 22 and the upstream portion of the RL brake hydraulic pressure adjustment unit 24. Similarly, the hydraulic pressure pump HP2 draws the brake fluid in a reservoir RS2 flowing back respectively from the pressure reducing valves PDfl and PDrr, and feeds the drawn (pressurized) brake fluid via check valves CV7 and CV8 respectively to the upstream portion of the FL brake hydraulic pressure adjustment unit 23 and the upstream portion of the RR brake hydraulic pressure adjustment unit 25.

The brake hydraulic pressure control unit 20 configured as described above feeds, when all the electromagnetic valves are in the first positions, the brake hydraulic pressures according to the operation force (braking operation amount by the driver) of the brake pedal BP to the respective wheel cylinders Wfl, Wfr, Wrl, and Wrr. Moreover, the brake hydraulic pressure control unit 20 can independently control the brake hydraulic pressures in the respective wheel cylinders Wfl, Wfr, Wrl, and Wrr. For example, the brake hydraulic pressure control unit 20 can reduce, maintain, or increase only the brake hydraulic pressure in the wheel cylinder Wfr by a predetermined amount by respectively controlling the linear control valve PC1, the hydraulic pressure pump HP1 (motor MT), the pressure increasing valve PUfr, and the pressure reducing valve PDfr. As a result, there is provided a configuration in which the respective brake units 11, 12, 13, and 14 can independently impart the braking forces by means of friction respectively to the left and right front wheels FW1 and FW2 and the left and right rear wheels RW1 and RW2.

Moreover, as illustrated in FIGS. 1 and 2, the behavior control device S includes a wheel turning angle sensor 31 and a vehicle speed sensor 32. The wheel turning angle sensor 31, for example, is assembled to the wheel turning mechanism 11, and outputs a signal representing an actual wheel turning angle δ of the left and right front wheels FW1 and FW2 corresponding to a rotation angle from a neutral position of the steering shaft 12. Note that, the actual wheel turning angle δ is "0" at the neutral position and, for example, represents the rotation angle in the left direction as a positive value, and represents the rotation angle in the right direction as a negative value. Moreover, in this specification, it is assumed that, when a relationship in magnitude of a detection value without taking into account the direction is discussed, the absolute value thereof is to be discussed. The vehicle speed sensor 32 detects the vehicle speed, and outputs a signal representing a vehicle speed V.

The wheel turning angle sensor 31 and the vehicle speed sensor 32 are connected to the electronic control unit 33. The electronic control unit 33 has a microcomputer formed of a CPU, a ROM, a RAM and the like as a main component, and controls, by executing various programs including programs to be described later, the operations of the brake hydraulic pressure control unit 20 and the in-wheel motors IWMfl, IWMfr, IWMrl, and IWMrr.

Therefore, to an output side of the electronic control unit 33, a drive circuit 34 for driving the brake hydraulic pressure control unit 20 (specifically, the linear control valve PC1, the linear control valve PC2, the FR brake hydraulic pressure adjustment unit 22, the FL brake hydraulic pressure adjustment unit 23, the RL brake hydraulic pressure adjustment unit 24, the RR brake hydraulic pressure adjustment unit 25, and the back-flow brake fluid feed unit 26) is connected. Moreover, to the output side of the electronic control unit 33, a drive circuit 35 for driving the in-wheel motors IWMfl, IWMfr, IWMrl, and IWMrr is connected.

Next, a detailed description is given of an operation of the behavior control device S configured as described above. On a conventional vehicle, when the driver rotationally operates the steering wheel 13 to turn the left and right front wheels FW1 and FW2, thereby turning the vehicle, there is a tendency that, mainly in a high-speed range in which the vehicle speed V is high, a change in direction by the yawing motion is large (diverges), the direction of the vehicle becomes unstable, and, in a low-speed range in which the vehicle speed V is small, a lag is generated in a change in direction by the yawing motion of the vehicle, and a sense of lightness becomes spoiled. In other words, as schematically shown in FIGS. 4A and 4B, these tendencies change according to the vehicle speed V, and are caused by a transient response characteristic of the yaw rate generated on the vehicle as the motion state amount in response to a periodical change (frequency change) in the actual wheel turning angle δ.

Figure 4A:
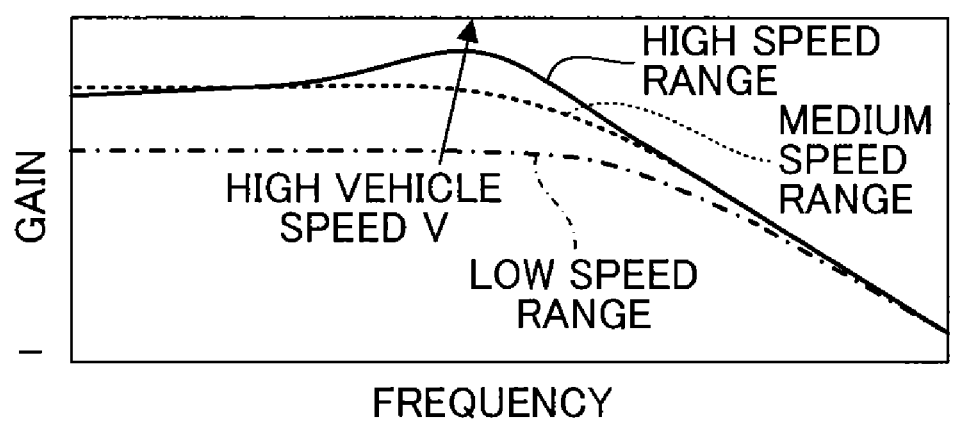
FIG. 4A A graph showing a frequency response characteristic of a yaw rate generated on the vehicle in response to a frequency change of a steering angle according to the first embodiment of the present invention.

Specifically, on the conventional vehicle, as shown in FIG. 4A, the gain (amplitude ratio) of the yaw rate with respect to the frequency change of the actual wheel turning angle δ is substantially constant when the frequency is low, as the frequency increases, presents a peak at a frequency coincident with a natural frequency of the vehicle, namely, at a resonance frequency, and, as the frequency increases further, tends to decrease. Then, the peak at the resonance frequency tends to increase as the vehicle speed V increases, namely, as the vehicle speed V increases, the damping ratio tends to decrease. Due to this tendency, mainly in the high speed range, excessive generation of the yaw deteriorates the directional stability of the vehicle.

Figure 4B:
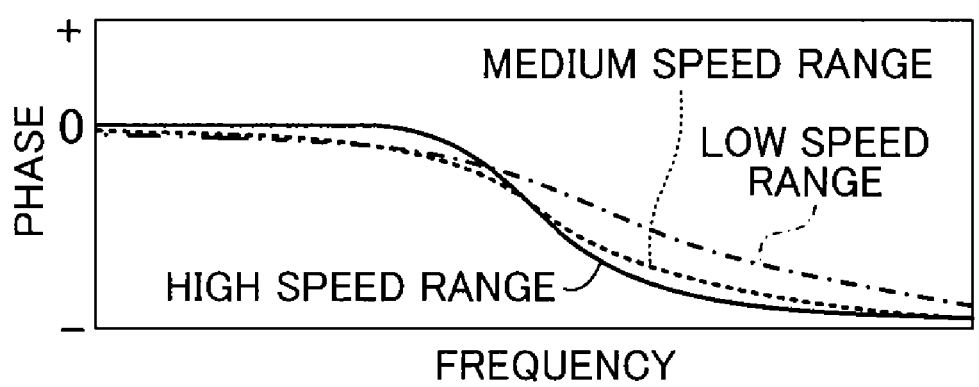
FIG. 4B A graph showing a frequency response characteristic of the yaw rate generated on the vehicle in response to the frequency change of the steering angle according to the first embodiment of the present invention.

Moreover, on a conventional vehicle, as shown in FIG. 4B, the phase angle of the yaw rate with respect to the frequency change of the turning angle δ is approximately "0" when the frequency is low, and the phase lag tends to increase as the frequency increases and the vehicle speed V increases. Then, mainly in the low speed range, as described above, the gain of the yaw rate tends to relatively decrease, the phase lag tends to be generated, a response lag becomes apparent, and the sense of lightness tends to be spoiled.

As a result, according to the turn operation of the steering wheel 13 by the driver, when the left and right front wheels FW1 and FW2 are merely turned to turn the vehicle, the vehicle turns presenting the above-mentioned frequency response characteristics. Thus, in order to restrain the excessive generation of the yaw particularly in the high speed range described above, and to improve the response lag in the low speed range, the electronic control unit 33 generates an appropriate yaw moment on the vehicle 10 in a turning state. Specifically, the electronic control unit 33 controls the magnitudes of the forward/backward forces imparted to, of the left and right front wheels FW1 and FW2 and the left and right rear wheels RW1 and RW2, the wheels on the inside of turn (hereinafter, also referred to as turning-inner-wheel side) and the wheels on the outside of turn (hereinafter, also referred to as turning-outer-wheel side), thereby generating a yaw moment at a position of the center of gravity of the vehicle 10. Hereinafter, a detailed description is given of the yaw moment control by the electronic control unit 33.

Figure 5:
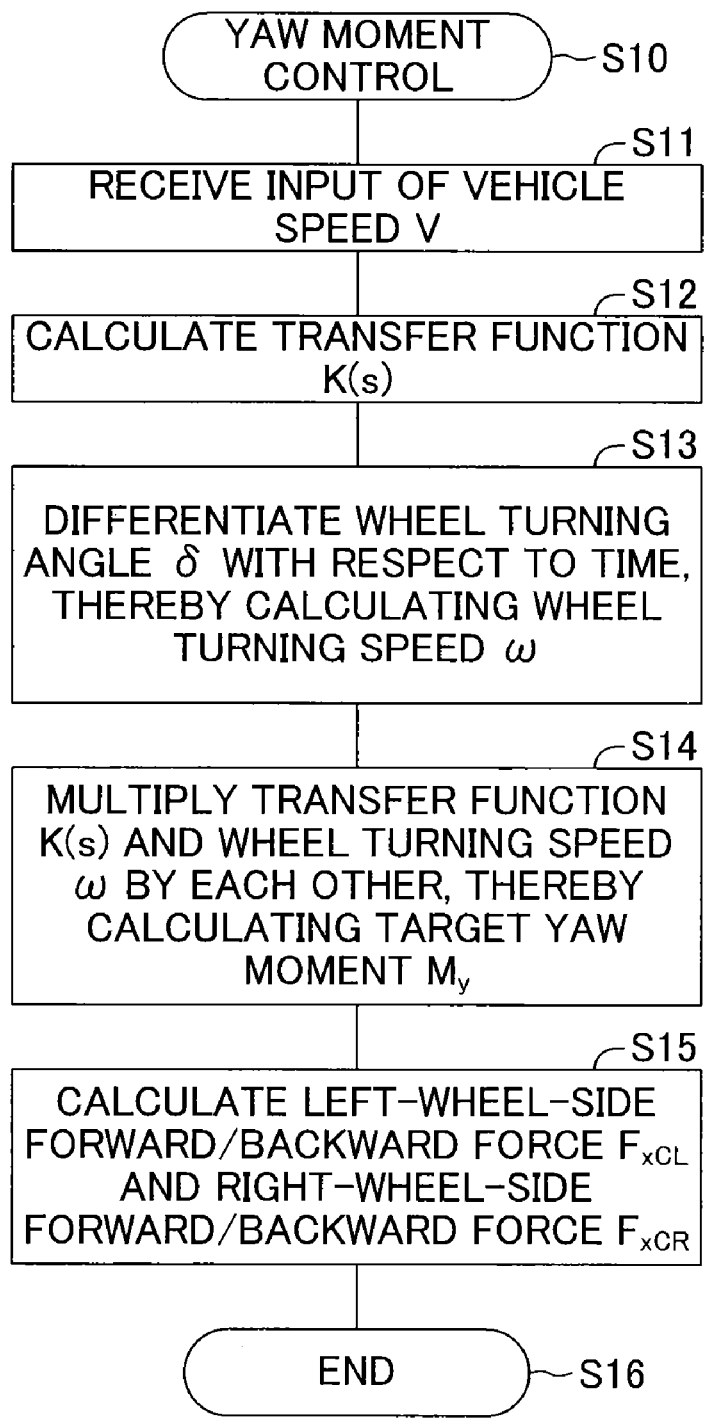
FIG. 5 A flowchart illustrating a yaw moment control program according to the first embodiment of the present invention and executed by an electronic control unit in FIG. 2.

The electronic control unit 33 determines, by executing a yaw moment control program illustrated in FIG. 5, the magnitudes of the forward/backward forces imparted to the turning-inner-wheel side and the magnitudes of the forward/backward forces imparted to the turning-outer-wheel side. In other words, in Step S10, the electronic control unit 33 starts the execution of the yaw moment control program, and, in Step S11, receives an input of the vehicle speed V detected by the vehicle speed sensor 33. Then, in Step S12, the electronic control unit 33 calculates a transfer function K(s) for calculating the target yaw moment $M_y$ to be generated on the vehicle 10. Hereinafter, a specific description is given of the transfer function K(s). Note that, in the following description, the target yaw moment $M_y$ is represented by a positive value when the target yaw moment $M_y$ turns the vehicle 10 toward the left direction, and is represented by a negative value when the target yaw moment $M_y$ turns the vehicle toward the right direction. Moreover, in the following description, s represents Laplace operator in each equation.

Generally, the equation of motion of the vehicle in the two-wheel vehicle model is represented by Equation 1 and Equation 2.

$$mV\frac{d\beta}{dt} + 2(K_f + K_r)\beta + \left\{mV + \frac{2}{V}(L_f K_f - L_r K_r)\right\}\gamma = 2K_f\delta \quad \text{Equation 1}$$

$$2(L_f K_f - L_r K_r)\beta + I_z\frac{d\gamma}{dt} + \frac{2(L_f^2 K_f + L_r^2 K_r)}{V}\gamma = 2L_f K_f\delta \quad \text{Equation 2}$$

where m in Equation 1 denotes the inertial mass of the vehicle. Moreover, $K_f$ and $K_r$ in Equations 1 and 2 denote a front wheel cornering power and a rear wheel cornering power of the vehicle; $L_f$ and $L_r$ denote a distance between the center of gravity of the vehicle and a front wheel axle and a distance between the center of gravity of the vehicle and a rear wheel axle; and δ denotes the actual wheel turning angle of the left and right front wheels FW1 and FW2. Moreover, $I_z$ in Equation 2 denotes a yawing moment of inertia of the vehicle.

Moreover, V in Equations 1 and 2 denotes the vehicle speed; β denotes a lateral slip angle in the center of gravity of the vehicle; and γ, a yaw rate of the vehicle.

On this occasion, in order to restrain the generation of the excessive yaw in the high speed range, and to improve the response lag in the low speed range, by adding the yaw moment $M_y$ to be generated on the vehicle 10 in a turning state to the right side of Equation 2, which is the equation of motion relating to the yaw, the following Equation 3 is acquired.

$$2(L_f K_f - L_r K_r)\beta + I_z \frac{d\gamma}{dt} + \frac{2(L_f^2 K_f + L_r^2 K_r)}{V}\gamma = \qquad \text{Equation 3}$$

$$2L_f K_f \delta + M_y$$

Then, by applying the Laplace transform respectively to Equations 1 and 3, and solving simultaneous equations regarding the yaw rate γ, the following Equation 4 is acquired.

$$\gamma = \frac{\begin{array}{c}-4K_f(K_f L_f - K_r L_r)\delta + \\ (2K_f L_f \delta + M_y)\{2(K_f + K_r) + mVs\}\end{array}}{2(K_f L_f - K_r L_r)\left\{\frac{2(K_f L_f - K_r L_r)}{V} + mV\right\} - \left\{I_z s + \frac{2(K_f L_f^2 + K_r L_r^2)}{V}\right\}\{2(K_f + K_r) + mVs\}} \qquad \text{Equation 4}$$

By the way, in order to improve the excessive yaw and the response lag generated by the transient response characteristic of the yaw rate γ shown in FIGS. 4A and 4B, namely, the frequency response characteristics, it is necessary to make the yaw rate γ to coincide with a yaw rate at a constant steering angle, namely, a yaw rate $\gamma_c$ in a steady state in which the gain is constant and the phase angle is "0". In other words, by generating the target yaw moment $M_y$ which causes the yaw rate γ to be equal to the yaw rate $\gamma_c$, the excessive yaw and the response lag can be improved. On this occasion, the yaw rate $\gamma_c$ in the steady state is acquired by setting the Laplace operator s to "0", and setting the target yaw moment $M_y$ to "0" in Equation 4, as illustrated in the following Equation 5.

$$\gamma_c = \frac{2K_f K_r (L_f + L_r)V\delta}{K_f\{L_f mV^2 - 2K_r(L_f + L_r)^2\} - K_r L_r mV^2} \qquad \text{Equation 5}$$

Then, the target yaw moment $M_y$ which causes the yaw rate γ calculated in accordance with Equation 4 to coincide with the yaw rate $\gamma_c$ in the steady state calculated in accordance with Equation 5, namely, causes the relationship $\gamma = \gamma_c$ to be established, can be calculated in accordance with the following Equation 6, which is acquired by reorganizing Equation 4 and Equation 5.

$$M_y = \frac{\begin{array}{c}2K_f V[I_z K_r(L_f + L_r)(2K_f + 2K_r + mVs) - \\ (K_f L_f - K_r L_r)m\{2K_r L_r(L_f + L_r) - L_f mV^2\}]\end{array}}{(2K_f + 2K_r + mVs)[K_r L_r mV^2 + K_f\{2K_r(L_f + L_r)^2 - L_f mV^2\}]}\delta s \qquad \text{Equation 6}$$

On this occasion, by defining a first term on the right side of Equation 6 as a transfer function K(s) as illustrated in Equation 7, the target yaw moment $M_y$ can be calculated by the following Equation 8 using the transfer function K(s).

$$K(s) = \frac{\begin{array}{c}2K_f V[I_z K_r(L_f + L_r)(2K_f + \\ 2K_r + mVs) - (K_f L_f - \\ K_r L_r)m\{2K_r L_r(L_f + L_r) - L_f mV^2\}]\end{array}}{(2K_f + 2K_r + mVs)[K_r L_r mV^2 + K_f\{2K_r(L_f + L_r)^2 - L_f mV^2\}]} \qquad \text{Equation 7}$$

$$M_y = K(s)\delta s = K(s)\omega \qquad \text{Equation 8}$$

where ω in Equation 8 denotes a wheel turning speed which is a time derivative value (=dδ/dt) of the actual wheel turning angle δ, and represents a wheel turning speed toward the left direction with respect to the vehicle 10 as a positive value and a wheel turning speed toward the right direction as a negative value.

Figure 6A:
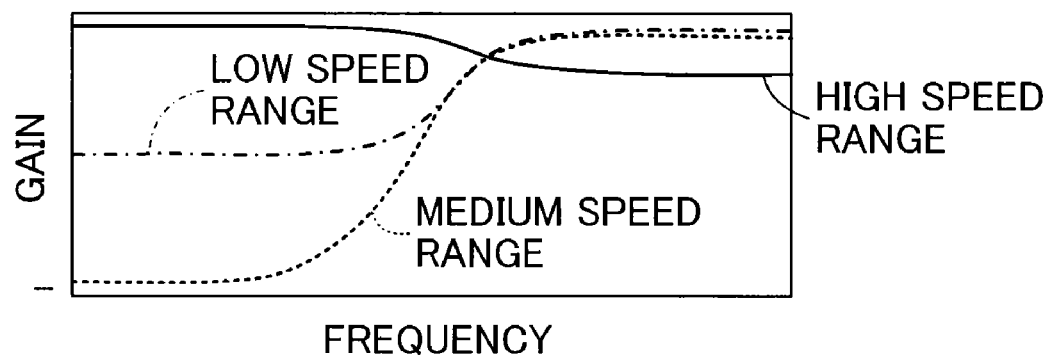
FIG. 6A A graph showing the frequency response characteristic of a transfer function having a wheel turning speed as an input, and a target yaw moment as an output according to the first embodiment of the present invention.
Figure 6B:
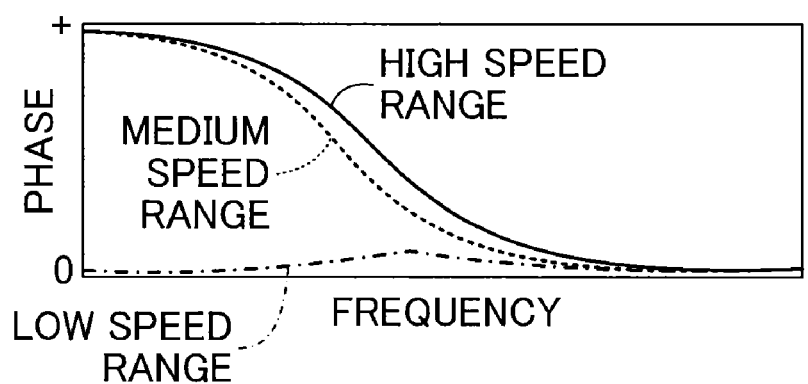
FIG. 6B A graph showing the frequency response characteristic of the transfer function having the wheel turning speed as the input, and the target yaw moment as the output according to the first embodiment of the present invention.
Figure 7:
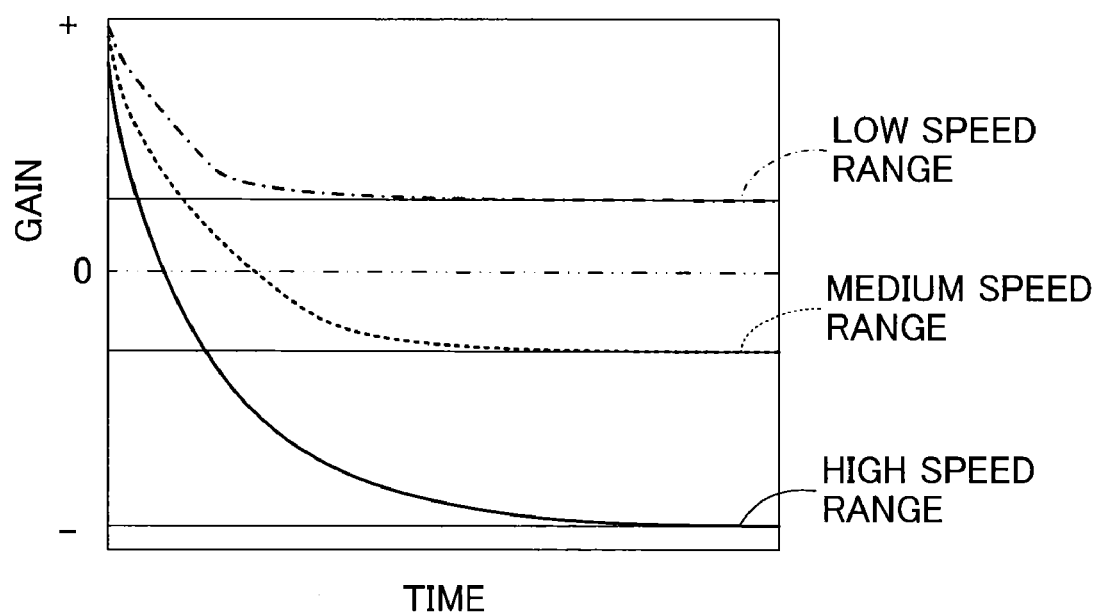
FIG. 7 A graph showing a step response characteristic of the transfer function having the steering speed as the input, and the target yaw moment as the output according to the first embodiment of the present invention.

By the way, the transfer function K(s) in Equation 7, as apparent from Equation 6 and Equation 8, has the wheel turning speed ω as an input, and has the target yaw moment $M_y$ as an output. Regarding the transfer function K(s), frequency response characteristics are shown in FIGS. 6A and 6B, and a step response characteristic is shown in FIG. 7. According to the transfer function K(s), as shown in FIG. 6A, the gain (amplitude ratio) of the target yaw moment $M_y$ with respect to the frequency change of the wheel turning speed ω has a change characteristic which decreases more or less as the frequency increases in a high speed range, and significantly increases as the frequency increases in a low speed range and a medium speed range. As a result, in particular, according to the change characteristic, the gain of the target yaw moment $M_y$ in the high frequency range is sufficiently acquired. Thus, the target yaw moment $M_y$ changes responsively according to the frequency change of the wheel turning speed ω of the left and right front wheels FW1 and FW2, and can particularly improve the above-mentioned decrease in gain in the yaw rate in the high frequency range.

Moreover, according to the transfer function K(s), as shown in FIG. 6B, the phase angle of the target yaw moment $M_y$ with respect to the frequency change of the wheel turning speed ω presents a change characteristic which advances the phase in the whole vehicle speed range. As a result, the target yaw moment $M_y$ changes responsively according to the frequency change of the wheel turning speed ω of the left and right front wheels FW1 and FW2, and, particularly by setting the phase angle to a value equal to or more than "0" in the low speed range, the response lag in the low speed range shown in FIG. 4B can be improved.

Moreover, according to the transfer function K(s), as shown in FIG. 7, in the entire vehicle speed range, the gain of the target yaw moment $M_y$ presents a step response of an attenuation in a non-oscillatory manner with respect to a time change. Then, according to this step response characteristic, in the low speed range, a gain of providing an incremental steering toward a wheel turning direction is acquired, and, in the medium and high speed range, a gain which causes an incremental steering on an initial stage, and a subsequent decremental steering is acquired. In other words, particularly in the high speed range, the gain which causes the decremental steering as the time elapses, as shown in FIG. 4A, is acquired, and the increase in the gain of the yaw rate at the resonance frequency can be restrained, which results in a restraint of generation of the excessive yaw.

Then, in Step S12, the electronic control unit 33 determines, in accordance with Equation 7, by using the vehicle speed V input from the vehicle speed sensor 33 in Step S11, the transfer function K(s) having this characteristic. Then, in Step S13, the electronic control unit 33 receives an input of the actual wheel turning angle δ of the left and right front wheels FW1 and FW2 from the wheel turning angle sensor 31, and differentiates the input actual wheel turning angle δ with respect to time, thereby calculating the wheel turning speed ω.

In subsequent Step S14, the electronic control unit 33 multiplies, in accordance with Equation 8, the transfer function K(s) determined in Step S12 and the wheel turning speed ω calculated in Step S13 by each other, thereby calculating the target yaw moment $M_y$. Then, the electronic control unit 33 proceeds, after calculating the target yaw moment $M_y$, to Step S15.

In Step S15, the electronic control unit 33 calculates, in order to generate the target yaw moment $M_y$ calculated in Step S14 on the vehicle 10, a left-wheel-side forward/backward force $F_{xCL}$ to be imparted to the left wheel side (namely, the left front wheel FW1 and the left rear wheel RW1) of the vehicle 10 and a right-wheel-side forward/backward force $F_{xCR}$ to be imparted to the right wheel side (namely, the right front wheel FW2 and the right rear wheel RW2) of the vehicle 10. A specific description is now given below of the calculation of the left-wheel-side forward/backward force $F_{xCL}$ and the right-wheel-side forward/backward force $F_{xCR}$.

Generally, by imparting a difference in the forward/backward force between the left and right wheels of a traveling vehicle, a yaw moment can be generated on the vehicle. Then, the difference in the forward/backward force between the left and right wheels can be generated by imparting a braking force to one wheel of the left and right wheels, and imparting a driving force to the other wheel. In this case, when the vehicle is turning, by imparting a braking force to a turning-inner-wheel side, and imparting a driving force to a turning-outer-wheel side, the direction of the yaw moment generated on the vehicle can be aligned to the turn direction of the vehicle.

Based on this point, it is assumed that, on the vehicle 10 currently turning toward the left direction, the target yaw moment $M_y$ toward the left direction (namely, having a positive value) is generated. On this occasion, the left-wheel-side forward/backward force $F_{xCL}$ imparted to the left front wheel FW1 and the left rear wheel RW1, which are on the turning-inner-wheel side, serves as a braking force, and the right-wheel-side forward/backward force $F_{xCR}$ imparted to the right front wheel FW2 and the right rear wheel RW2, which are on the turning-outer-wheel side, serves as a driving force. In the following description, the braking force is represented by a negative value, and the driving force is represented by a positive value.

On this occasion, in order to prevent the deceleration of the vehicle 10 as a result of imparting the left-wheel-side forward/backward force $F_{xCL}$ (braking force) and the right-wheel-side forward/backward force $F_{xCR}$ (driving force), a case where absolute values of the left-wheel-side forward/backward force $F_{xCL}$ and the right-wheel-side forward/backward force $F_{xCR}$ are the same value of $F_x$ is taken into account. If the tread width of the vehicle 10 is d, the target yaw moment $M_y$ at the center of gravity geometrically satisfies the following Equation 9.

$$M_y = F_x \frac{d}{2} + F_x \frac{d}{2} = F_x d \qquad \text{Equation 9}$$

For easy understanding of the following description, the case where the absolute values of the left-wheel-side forward/backward force $F_{xCL}$ and the right-wheel-side forward/backward force $F_{xCR}$ are the same value of $F_x$ is taken into account, but it should be understood that the absolute values of the left-wheel-side forward/backward force $F_{xCL}$ and the right-wheel-side forward/backward force $F_{xCR}$ may be different from each other.

Thus, the left-wheel-side forward/backward force $F_{xCL}$ and the right-wheel-side forward/backward force $F_{xCR}$ can be calculated based on Equation 9 according to the following Equation 10.

$$F_{xCL} = -\frac{M_y}{d} \qquad \text{Equation 10}$$
$$F_{xCR} = \frac{M_y}{d}$$

Note that, in Equation 10, according to the configuration in which the target yaw moment $M_y$ toward the left direction is a positive value, the left-wheel-side forward/backward force $F_{xCL}$ is multiplied by "−1".

Then, the electronic control unit 33 calculates, in accordance with Equation 10 using the target yaw moment $M_y$ calculated in Step S14, the left-wheel-side forward/backward force $F_{xCL}$ and the right-wheel-side forward/backward force $F_{xCR}$. After the electronic control unit 33 calculates the left-wheel-side forward/backward force $F_{xCL}$ and the right-wheel-side forward/backward force $F_{xCR}$ in this way, in Step S16, the electronic control unit 33 once finishes the execution of the yaw moment control program, and, after an elapse of a predetermined short period, starts the yaw moment control program in Step S10.

The electronic control unit 33 calculates, by executing the above-mentioned yaw moment control program, the left-wheel-side forward/backward force $F_{xCL}$ and the right-wheel-side forward/backward force $F_{xCR}$, and then generates the left-wheel-side forward/backward force $F_{xCL}$ on the left wheel side (left front wheel FW1 and left rear wheel RW1), and the right-wheel-side forward/backward force $F_{xCR}$ on the right wheel side (right front wheel FW2 and right rear wheel RW2). In this case, the electronic control unit 33, for example, divides the left-wheel-side forward/backward force $F_{xCL}$ into equal two parts, and generates the equally halved left-wheel-side forward/backward force $F_{xCL}/2$ respectively on the left front wheel FW1 and the left rear wheel RW1. Further, the electronic control unit 33, for example, divides the right-wheel-side forward/backward force $F_{xCR}$ into equal two parts, and generates the equally halved right-wheel-side forward/backward force $F_{xCR}/2$ respectively on the right front wheel FW2 and the right rear wheel RW2.

Specifically, a description is given while a case where the vehicle 10 is turning toward the left direction is exemplified, and, in this case, the target yaw moment $M_y$ calculated in Step S14 by the yaw moment control program is a positive value. Thus, the left-wheel-side forward/backward force $F_{xCL}$ calculated in Step S15 is a negative value, namely, a braking force, and the right-wheel-side forward/backward force $F_{xCR}$ calculated in Step S15 is a positive value, namely, a driving force. When the vehicle is turning toward the right direction, the target yaw moment $M_y$ calculated in Step S14 by the yaw moment control program is a negative value. Thus, the left-wheel-side forward/backward force $F_{xCL}$ calculated in Step S15 is a positive value, namely, a driving force, and the right-wheel-side forward/backward force $F_{xCR}$ calculated in Step S15 is a negative value, namely, a braking force. Therefore, when the vehicle 10 is turning toward the left direction, the electronic control unit 33 generates the braking force coincident with the equally halved left-wheel-side forward/backward force $F_{xCL}/2$ respectively on the left front wheel FW1 and the left right wheel RW1 on the turning-inner-wheel side. In other words, the electronic control unit 33 first switches, via the drive circuit 34, both the linear control valve PC1 and the linear control valve PC2 of the brake hydraulic pressure control unit 20 to the second positions, maintains the respective pressure increasing valves PUfl and PUrl, and the respective pressure reducing valves PDfl and PDrl of the FL brake hydraulic pressure adjustment unit 23 and the RL brake hydraulic pressure adjustment unit 24 to the first positions, and switches the respective pressure increasing valves PUfr and PUrr, and the respective pressure reducing valves PDfr and PDrr of the FR brake hydraulic pressure adjustment unit 22 and the RR brake hydraulic pressure adjustment unit 25 to the second positions. When the vehicle 10 is turning toward the right direction, the electronic control unit 33 switches both the linear control valve PC1 and the linear control valve PC2 of the brake hydraulic pressure control unit 20 to the second positions, maintains the respective pressure increasing valves PUfl and PUrl, and the respective pressure reducing valves PDfl and PDrl of the FR brake hydraulic pressure adjustment unit 22 and the RR brake hydraulic pressure adjustment unit 25 to the first positions, and switches the respective pressure increasing valves PUfr and PUrr, and the respective pressure reducing valves PDfr and PDrr of the FL brake hydraulic pressure adjustment unit 23 and the RL brake hydraulic pressure adjustment unit 24 to the second positions.

Then, the electronic control unit 33 controls the motor MT of the back flow brake fluid feed unit 26 to drive, thereby controlling the pumps HP1 and HP2 to feed the pressurized brake fluid. As a result, the FL brake hydraulic pressure adjustment unit 23 and the RL brake hydraulic pressure adjustment unit 24, in which the respective pressure increasing valves PUfl and PUrl and the respective pressure reducing valves PDfl and PDrl are maintained to the first positions, increases, by supplying the brake fluid from the pumps HP1 and HP2, the brake hydraulic pressures in the wheel cylinders Wfl and Wrl, thereby generating the braking forces coincident with the equally halved left-wheel-side forward/backward force $F_{xCL}/2$ respectively on the left front wheel FW1 and the left rear wheel RW1. On the other hand, the FR brake hydraulic pressure adjustment unit 22 and the RR brake hydraulic pressure adjustment unit 25, in which the respective pressure increasing valves PUfr and PUrr and the respective pressure reducing valves PDfr and PDrr are maintained to the second positions, decreases, without supplying the brake fluid, the brake hydraulic pressures in the wheel cylinders Wfr and Wrr, thereby preventing the braking forces from being generated on the right front wheel FW2 and the right rear wheel RW2.

Note that, the electronic control unit 33 receives, as inputs, from pressure gauges (not shown), which are provided respectively on the FR brake hydraulic pressure adjustment unit 22, the FL brake hydraulic pressure adjustment unit 23, the RL brake hydraulic pressure adjustment unit 24, and the RR brake hydraulic pressure adjustment unit 25, the brake hydraulic pressures in the wheel cylinders Wfr, Wfl Wrl and Wrr. Then, the electronic control unit 33 drives, by using the detected brake hydraulic pressures, based on relationships set in advance respectively between the brake hydraulic pressures in the wheel cylinders Wfr, Wfl, Wrl and Wrr and the braking forces, the motor MT until the braking forces coincide with the left-wheel-side forward/backward force $F_{xCL}/2$ (or, when the vehicle 10 is turning toward the right direction, the right-wheel-side forward/backward force $F_{xCR}/2$).

Moreover, the electronic control unit 33 generates, respectively on the right front wheel FW2 and the right rear wheel RW2, which are on the turning-outer-wheel side, the driving forces coincident with the equally halved right-wheel-side forward/backward force $F_{xCR}/2$. In other words, the electronic control unit 33 first determines, based on the well-known PWM control, target voltages, which are in a predetermined relationship with the right-wheel-side forward/backward force $F_{xCR}/2$, for driving the in-wheel motors IWMfr and IWMrr provided on the right front wheel FW2 and the right rear wheel RW2. Then, the electronic control unit 33 outputs PWM control voltage signals corresponding to the target voltages to the drive circuit 35. The drive circuit 35 turns on/off the switching elements at duty ratios corresponding to the PWM control voltage signals, thereby applying the target voltages to the in-wheel motors IWMfr and IWMrr. As a result, the in-wheel motors IWMfr and IWMrr generate, respectively on the right front wheel FW2 and the right rear wheel RW2, the driving forces coincident with the equally halved right-wheel-side forward/backward force $F_{xCR}/2$.

Figure 8A:
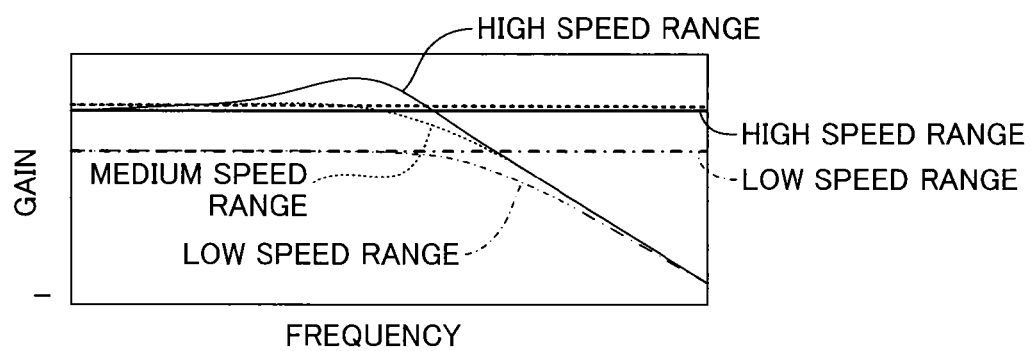
FIG. 8A An explanatory graph showing the frequency response characteristic of a yaw rate (yaw rate in a steady state) generated on the vehicle in response to the frequency change of the steering angle when the target yaw moment is generated according to the first embodiment of the present invention.
Figure 8B:
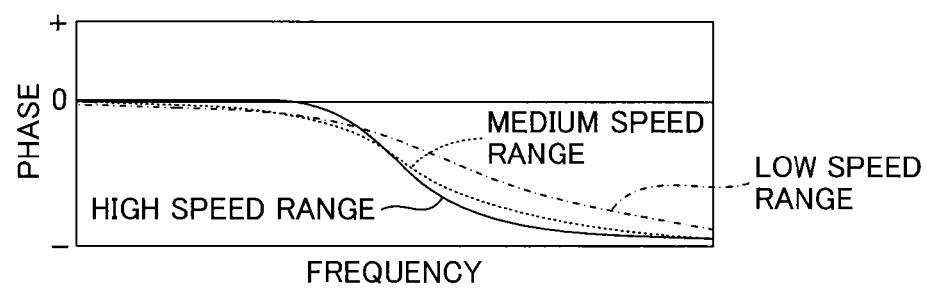
FIG. 8B An explanatory graph showing the frequency response characteristic of the yaw rate (yaw rate in the steady state) generated on the vehicle in response to the frequency change of the steering angle when the target yaw moment is generated according to the first embodiment of the present invention.

A description is now given of the yaw rate $\gamma$ generated on the turning vehicle 10 by generating the left-wheel-side forward/backward force $F_{xCL}$ on the left wheel side (left front wheel FW1 and left rear wheel RW1) and generating the right-wheel-side forward/backward force $F_{xCR}$ on the right wheel side (right front wheel FW2 and right rear wheel RW2), namely, generating the target yaw moment $M_y$. The target yaw moment $M_y$ calculated in accordance with Equation 8 is calculated by multiplying the transfer function $K(s)$ by the steering speed $\omega$. Then, the target yaw moment $M_y$ controls the yaw rate $\gamma$ generated on the vehicle 10 so as to coincide with the yaw rate $\gamma_c$ in the steady state. Therefore, as illustrated in FIGS. 8A and 8B, in the low speed range, the medium speed range, and the high speed range, the gain of the yaw rate $\gamma$ generated on the vehicle 10 is constant with respect to the frequency change of the actual wheel turning angle $\delta$, and the phase angle of the yaw rate $\gamma$ is approximately constant "0" with respect to the frequency change of the actual wheel turning angle $\delta$.

Figure 9A:
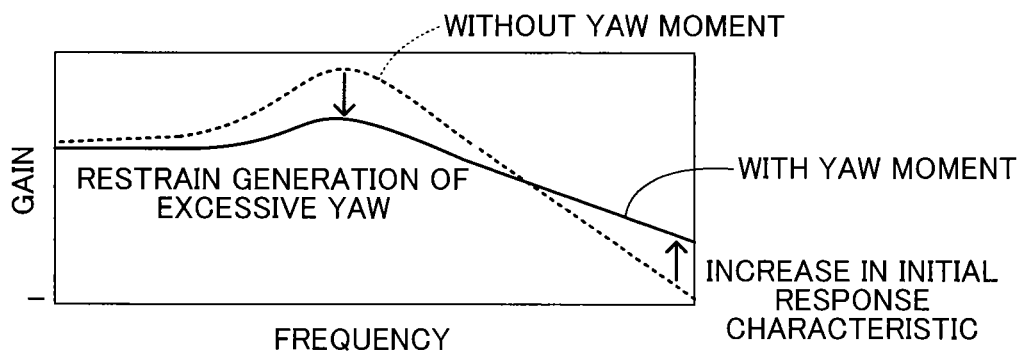
FIG. 9A An explanatory graph showing a change in the frequency response characteristic of the yaw rate generated on the vehicle when the target yaw moment is generated.
Figure 9B:
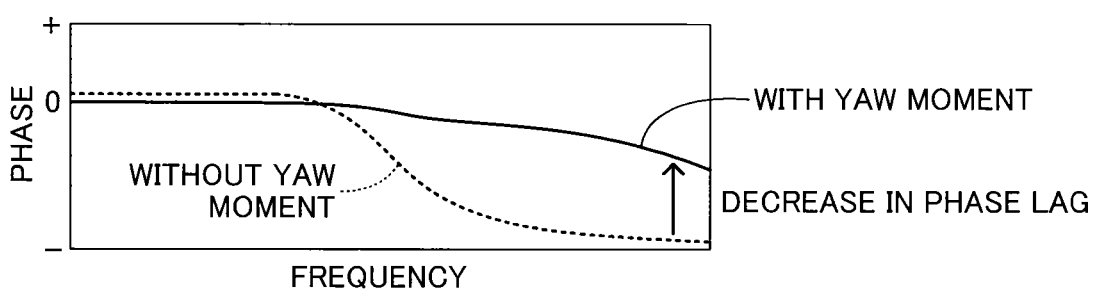
FIG. 9B An explanatory graph showing a change in the frequency response characteristic of the yaw rate generated on the vehicle when the target yaw moment is generated.

As a result, as illustrated by the solid line of FIG. 9A corresponding to FIG. 4A, when, by generating the left-wheel-side forward/backward force $F_{xCL}$ on the left wheel side (left front wheel FW1 and left rear wheel RW1) and generating the right-wheel-side forward/backward force $F_{xCR}$ on the right wheel side (right front wheel FW2 and right rear wheel RW2), the target yaw moment $M_y$ is generated on the vehicle 10, compared with a case represented by the broken line where the target yaw moment $M_y$ is not generated, the generation of the excessive yaw at the resonance frequency is restrained, and the decrease in gain in the high frequency range is restrained, which results in an increase in initial response characteristic. Moreover, as illustrated by the solid line of FIG. 9B corresponding to FIG. 4B, when, by generating the left-wheel-side forward/backward force $F_{xCL}$ on the left wheel side (left front wheel FW1 and left rear wheel RW1) and generating the right-wheel-side forward/backward force $F_{xCR}$ on the right wheel side (right front wheel FW2 and right rear wheel RW2), the target yaw moment is generated on the vehicle 10, compared with a case represented by the broken line where the target yaw moment $M_y$ is not generated, the phase lag in the high frequency range is restrained, which results in improvement of the response lag.

As can be understood from the description given above, according to the first embodiment, the electronic control unit 33 can calculate, by using the transfer function $K(s)$ for controlling the yaw rate $\gamma$ generated on the vehicle 10 to coincide with the yaw rate $\gamma_c$ in the steady state, and by multiplying the transfer function K(s) by the wheel turning speed ω, the target yaw moment $M_y$. As a result, the transfer function K(s) is determined so as to improve the gain change and the phase lag of the yaw rate γ with respect to the frequency change in the wheel turning speed ω, and the target yaw moment $M_y$ calculated by using the transfer function K(s) is thus calculated so as to efficiently restrain the directional stability and the responsiveness of the vehicle.

Then, the electronic control unit 33 calculates the left-wheel-side forward/backward force $F_{xCL}$ and the right-wheel-side forward/backward force $F_{xCR}$ for generating the target yaw moment $M_y$, and can generate the braking force or driving force on the left wheel side or the right wheel side. As a result, the appropriate target yaw moment $M_y$ can be generated on the vehicle 10 in the turning state, and, as a result, the change in the frequency response characteristic of the yaw rate γ generated on the vehicle 10, specifically, the change in the response characteristic of the gain of the yaw rate γ can be significantly restrained. In other words, in this case, the frequency response characteristic of the yaw rate γ generated on the vehicle 10 can be approximately constant, and the directional stability and the responsiveness can be extremely appropriately maintained. Thus, satisfactory directional stability and responsiveness during the vehicle turn can be acquired, and, regarding the change in the yaw rate γ generated on the vehicle 10, a sense of discomfort felt by a driver can be significantly restrained.

Moreover, the electronic control unit 33 can determine, by even taking into account the frequency response characteristics of the yaw rate γ of the vehicle changing depending on the vehicle speed V, the transfer function K(s), and the target yaw moment $M_y$ calculated by using the transfer function K(s) is calculated so as to restrain the generation of an excessive yaw in the high speed range, to secure the directional stability of the vehicle, and to appropriately improve the responsiveness in the low speed range. Thus, based on the vehicle speed V, more satisfactory directional stability and responsiveness can be acquired.

a-1. Modified Example of First Embodiment

According to the first embodiment, the left front wheel FW1 and the left rear wheel RW1 as a whole generate the left-wheel-side forward/backward force $F_{xCL}$, and the right front wheel FW2 and the right rear wheel RW2 as a whole generate the right-wheel-side forward/backward force $F_{xCR}$, thereby generating the target yaw moment $M_y$ on the vehicle 10. Specifically, the left front wheel FW1 and the left rear wheel RW1 as a whole generate the braking force (or driving force) coincident with the left-wheel-side forward/backward force $F_{xCL}$, and the right front wheel FW2 and the right rear wheel RW2 as a whole generate the driving force (or braking force) coincident with the right-wheel-side forward/backward force $F_{xCR}$, thereby generating the target yaw moment $M_y$ toward the left direction or the target yaw moment $M_y$ toward the right direction on the vehicle 10.

By the way, in general, for a suspension structure on the rear wheel side of a vehicle, in order to restrain a lift of a rear portion of the vehicle caused by deceleration, a so-called anti-lift geometry structure on which a force (anti-lift force) for pulling a body downward in response to the braking forces imparted to the rear wheels acts is widely employed. Therefore, the electronic control unit 33 may generate the left-wheel-side forward/backward force $F_{xCL}$ only on the left rear wheel RW1, and the right-wheel-side forward/backward force $F_{xCR}$ only on the right rear wheel RW2, thereby generating the target yaw moment on the vehicle 10.

According to this modified example, for example, when the vehicle 10 is turning toward the left direction, on the left rear wheel RW1, which is on the turning-inner-wheel side, a braking force coincident with the left-wheel-side forward/backward force $F_{xCL}$ can be generated. As a result, on the body coupled to the left rear wheel RW1, the anti-lift force acts, and the lift, namely, a roll behavior, of the inner wheel side caused by the turn can be efficiently restrained. On the other hand, when the vehicle 10 is turning toward the left direction, on the right rear wheel RW2, which is on the turning-outer-wheel side, a driving force coincident with the right-wheel-side forward/backward force $F_{xCR}$ can be generated. As a result, on the body coupled to the right rear wheel RW2, a force in the opposite direction of the anti-lift force for lifting the body upward acts, and a dive, namely, the roll behavior, of the outer wheel side caused by the turn can be efficiently restrained.

Then, also according to this modified example, the left rear wheel RW1 generates the braking force (or driving force) coincident with the left-wheel-side forward/backward force $F_{xCL}$, and the right rear wheel RW2 generates the driving force (or braking force) coincident with the right-wheel-side forward/backward force $F_{xCR}$, thereby generating the target yaw moment $M_y$ toward the left direction or the target yaw moment $M_y$ toward the right direction on the vehicle 10. As a result, as in the first embodiment, the frequency response characteristic of the yaw rate γ generated on the vehicle 10 can be approximately constant, and the directional stability and the responsiveness can be extremely appropriately maintained. Thus, more satisfactory directional stability and responsiveness during the vehicle turn can be acquired, and, regarding the change in the yaw rate γ generated on the vehicle 10, the sense of discomfort felt by a driver can be more significantly restrained.

b. Second Embodiment

According to the first embodiment and the modified example, in order to generate the target yaw moment $M_y$, the braking force (or driving force) coincident with the left-wheel-side forward/backward force $F_{xCL}$ is generated on the left wheel side, and the driving force (or braking force) coincident with the right-wheel-side forward/backward force $F_{xCR}$ is generated on the right wheel side. In other words, according to the first embodiment and the modified example, by using the braking force and the driving force, the target yaw moment $M_y$ is generated. In this case, by using only the braking force, the target yaw moment $M_y$ can be generated. A detailed description is now given of a second embodiment, and the same components are denoted by the same reference symbols as those of the first embodiment and detailed descriptions thereof are omitted.

According to the second embodiment, as indicated by the broken lines of FIG. 1 and FIG. 2, the behavior control device S includes a steering angle sensor 36. The steering angle sensor 36 is assembled to the steering shaft 12, and outputs a signal representing a steering angle θ corresponding to the rotation angle from a neutral position of the steering shaft 12 (steering wheel 13) to the electronic control unit 33. Note that, the steering angle θ is "0" at the neutral position, for example, represents the rotation angle in the left direction as a positive value, and represents the rotation angle in the right direction as a negative value.

Figure 10:
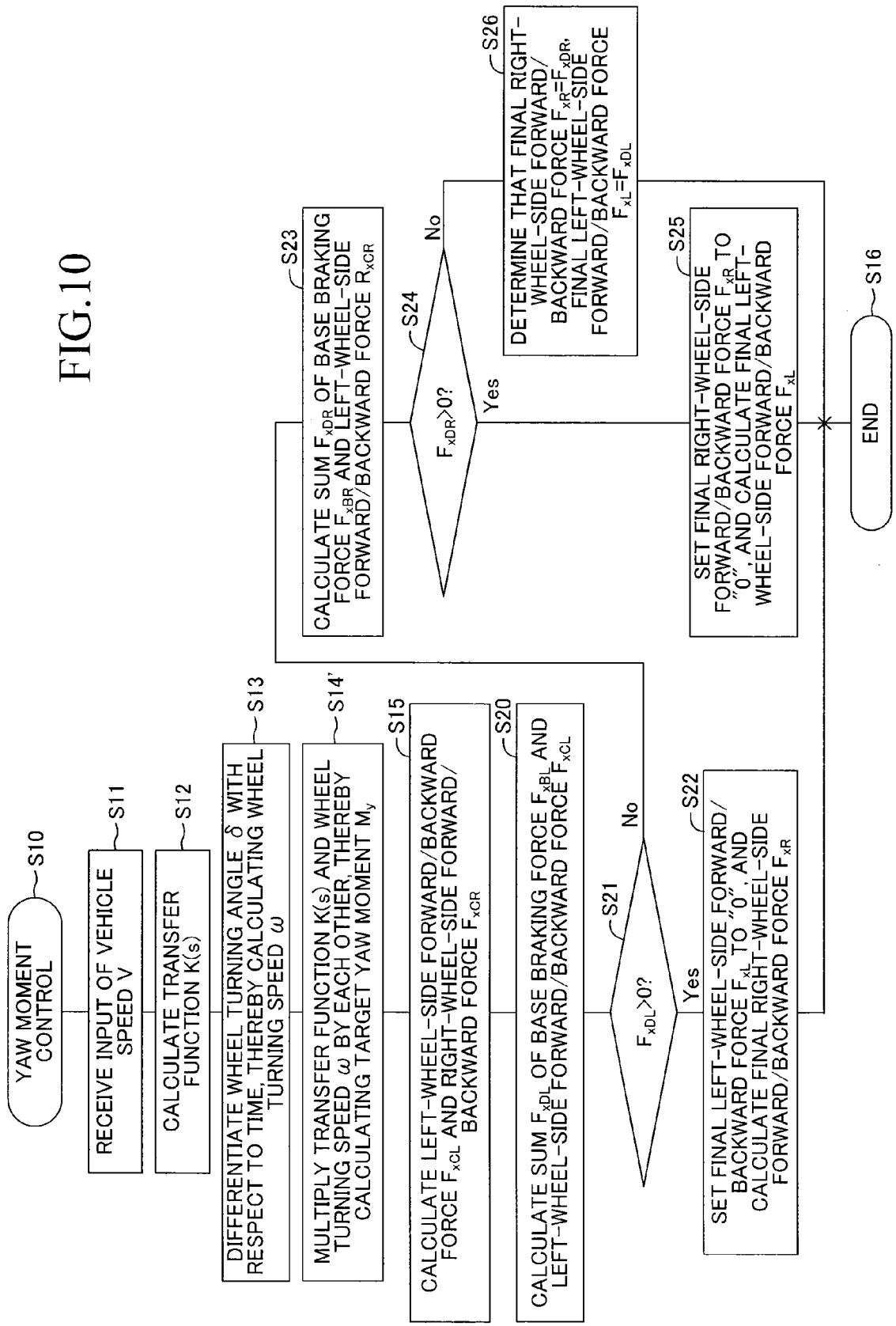
FIG. 10 A flowchart illustrating a yaw moment control program according to a second embodiment of the present invention and executed by the electronic control unit in FIG. 2.

Then, according to the second embodiment, the electronic control unit 33 executes the yaw moment control program illustrated in FIG. 10. On this occasion, the yaw moment control program according to the second embodiment is, compared with the yaw moment control program according to the first embodiment, slightly different in contents of processing in Step S14, and in that Steps S20 to S26 are added. A detailed description is now given of these different steps.

Also according to the second embodiment, in Step S10, the electronic control unit 33 starts the execution of the yaw moment control program. Then, in Step S12, the electronic control unit 33 determines, as in the first embodiment, in accordance with Equation 7, the transfer function K(s) corresponding to the detected vehicle speed V. After the determination of the transfer function K(s) in this way, in Step S13, the electronic control unit 33 calculates, by differentiating, with respect to time, the actual wheel turning angle δ of the left and right front wheels FW1 and FW2, the turning speed ω, and proceeds to Step S14'.

In subsequent Step S14', as in the first embodiment, the electronic control unit 33 multiplies, in accordance with Equation 8, the transfer function K(s) determined in Step S12 and the wheel turning speed ω calculated in Step S13 by each other, thereby calculating the target yaw moment $M_y$. Further, in Step S14', the electronic control unit 33 also receives the input of the steering angle θ from the steering angle sensor 36, and when the direction (sign) of the calculated target yaw moment $M_y$ and the direction of the yaw rate γ changing depending on the steering operation of the steering wheel 13 by the driver, namely, the change in the steering angle θ detected by the steering angle sensor 36 are different from each other, calculates the target yaw moment $M_y$ as "0".

By calculating the target yaw moment $M_y$ as "0" in this way, as described later, even when the vehicle 10 is decelerating, it is possible to make the driver hardly feel a sense of discomfort. A specific description is now given of this point. First, it is assumed that the driver is carrying out an operation of steering (namely, operation of incrementally steering) the steering wheel 13 so that the absolute value of the actual wheel turning angle δ of the left and right front wheels FW1 and FW2 increases. In this case, in response to the operation of incrementally steering the steering wheel 13, for example, an assist direction of an assist mechanism for assisting the wheel turning operations of the left and right front wheels FW1 and FW2 does not change, and the direction of the wheel turning speed ω of the left and right front wheels FW1 and FW2 thus coincides with the incremental steering operation direction by the driver. As a result, the calculated target yaw moment $M_y$ coincides with the operation direction of the steering wheel 13 by the driver, namely, the direction of the yaw rate γ (yaw) expected to be generated by the incremental steering operation of the steering wheel 13 by the driver. Thus, in this case, the target yaw moment $M_y$ appropriate for a turn request by the driver is calculated, and even if the vehicle 10 is decelerating as described later, the driver thus hardly feels the sense of discomfort.

Then, it is assumed that the driver is carrying out operation of steering (namely, operation of decrementally steering) the steering wheel 13 from the incremental steering so that the absolute value of the actual wheel turning angle δ of the left and right front wheels FW1 and FW2 decreases. In this case, the direction of the yaw rate γ (yaw) expected to be generated by the decremental operation from the incremental operation of the steering wheel 13 by the driver is reversed to the opposite direction. On this occasion, when the assist direction by the assist mechanism cannot quickly follow the decremental steering operation of the steering wheel 13, the direction of the wheel turning speed ω of the left and right front wheels FW1 and FW2 may not coincide with the direction of the decremental steering operation by the driver.

Therefore, the calculated target yaw moment $M_y$ does not coincide with the operation direction of the steering wheel 13 by the driver, namely, the direction of the yaw rate γ (yaw) expected to be generated by the decremental steering operation of the steering wheel 13 by the driver. As a result, in this case, even though the driver wants to increase the yaw rate γ (namely, yaw) in the direction of the decremental steering operation of the steering wheel 13, the calculated target yaw moment $M_y$ decreases the yaw rate γ (yaw). Thus, in this case, the target yaw moment $M_y$ inappropriate for a turn request by the driver is calculated, and in addition, the vehicle 10 decelerates as described later, and thus the driver tends to feel the sense of discomfort.

Therefore, when the direction of the calculated target yaw moment $M_y$ and the direction of the yaw rate γ changing depending on the change in the steering angle θ are different from each other, the electronic control unit 33 calculates the target yaw moment $M_y$ as "0". Then, after the calculation of the target yaw moment $M_y$ in previous Step S14', in Step S15, the electronic control unit 33 calculates, as in the first embodiment and the modified example, in accordance with Equation 10 using the target yaw moment $M_y$, the left-wheel-side forward/backward force $F_{xCL}$ and the right-wheel-side forward/backward force $F_{xCR}$, and proceeds to Step S20.

In Step S20, the electronic control unit 33 calculates, based on the operation of the brake pedal BP by the driver, $F_{xDL}$, which is a sum of a deceleration braking force $F_{AIL}$ imparted to the left wheel side (left front wheel FW1 and left rear wheel RW1) and the left-wheel-side forward/backward force $F_{xCL}$ calculated in Step S15, in accordance with the following Equation 11.

$$F_{xDL}=F_{xBL}+F_{xCL} \qquad \text{Equation 11}$$

Note that, the electronic control unit 33 receives, as an input, the brake hydraulic pressure in the wheel cylinders Wfl and Wrl from the pressure gauges (not shown), which are provided respectively on the FL brake hydraulic pressure adjustment unit 23 and the RL brake hydraulic pressure adjustment unit 24. Then, the electronic control unit 33 calculates, by using the detected brake hydraulic pressures, based on the relationship set in advance respectively between the brake hydraulic pressures in the wheel cylinders Wfl and Wrl and the braking forces, the deceleration braking force $F_{xBL}$.

Then, in Step S21, the electronic control unit 33 determines whether or not the sum $F_{xDL}$ on the left wheel side calculated in Step S20 is larger than "0", namely, the sum $F_{xDL}$ is a positive value. Specifically, when the SUM $F_{xDL}$ is larger than "0", namely, is a positive value, the electronic control unit 33 determines as "Yes", and proceeds to Step S22. On this occasion, the case where the sum $F_{xDL}$ is a positive value is a case where the deceleration braking force $F_{xBL}$ (negative value: braking force) is smaller than the left-wheel-side forward/backward force $F_{xCL}$ (positive value: driving force), namely, the vehicle 10 is turning to the right direction, and the target yaw moment $M_y$ is calculated as a negative value.

On the other hand, when the sum $F_{xDL}$ is equal to or less than "0", namely, the sum $F_{xDL}$ is "0" or a negative value, the electronic control unit 33 determines as "No", and proceeds to Step S23. On this occasion, the case where the sum $F_{xDL}$ is "0" or a negative value is a case where the absolute value of the left-wheel-side forward/backward force $F_{xCL}$ is equal to or less than the absolute value of the deceleration braking force $F_{xBL}$ (negative value: braking force). In other words, the above-mentioned case is a case where the vehicle 10 is turning toward the left direction and the target yaw moment $M_y$ is calculated as a positive value, or a case where the vehicle 10 is turning toward the right direction, and the target yaw moment $M_y$ is calculated as a small negative value.

In Step S22, the electronic control unit 33 calculates a final left-wheel-side forward/backward force $F_{xL}$ as "0", and calculates a final right-wheel-side forward/backward force $F_{xR}$ according to the following Equation 12.

$$F_{xR}=F_{xBR}+F_{xCR}-F_{xDL} \qquad \text{Equation 12}$$

On this occasion, a specific description is now given of the processing in Step S22. According to the second embodiment, the target yaw moment $M_y$ is generated by using only the braking forces. In this case, setting the braking force on the turning-outer-wheel side to be smaller than the braking force on the turning-inner-wheel side is relatively equivalent to a state in which the turning-outer-wheel side generates a driving force, and, as in the first embodiment and the modified example, the target yaw moment $M_y$ can be generated.

However, when the driving force to be generated on the turning-outer-wheel side is larger than the braking force, namely, in Step S21, the sum $F_{xDL}$ is a positive value, and the determination "Yes" is made, even if the deceleration braking force $F_{xBL}$ of the left front wheel FW1 and the left rear wheel RW1, which are on the turning-outer-wheel side, is decreased to "0", the left-wheel-side forward/backward force $F_{xCL}$ as a driving force required for generating the target yaw moment $M_y$ is insufficient by the amount of the sum $F_{xDL}$. Thus, when the target yaw moment $M_y$ is generated only by the braking forces, by adding only the sum $F_{xDL}$ corresponding to the insufficient amount to the braking forces of the right front wheel FW2 and the right rear wheel RW2 (sum of the deceleration braking force $F_{xBR}$ and the right-wheel-side forward/backward force $F_{xCR}$), which are on the turning-inner-wheel side, the target yaw moment $M_y$ can be generated.

Based on this point, the left-wheel-side forward/backward force $F_{xCL}$ as the driving forces of the left front wheel FW1 and the left rear wheel RW1, which are on the turning-outer-wheel side, is insufficient by the amount of the sum $F_{xDL}$ even if the deceleration braking force $F_{xBL}$ is decreased to "0", and, thus, in Step S22, the electronic control unit 33 sets the final left-wheel-side forward/backward force $F_{xL}$ (braking force) to "0". On the other hand, the electronic control unit 33 calculates, in accordance with Equation 12, by adding, to the braking forces of the right front wheel FW2 and the right rear wheel RW2 (sum of the deceleration braking force $F_{xBR}$ and the right-wheel-side forward/backward force $F_{xCR}$), which are on the turning-inner-wheel side, the insufficient amount of the sum $F_{xDR}$ as the braking force, the final right-wheel-side forward/backward force $F_{xR}$ (braking force).

In Step S23, the electronic control unit 33 calculates, based on the operation of the brake pedal BP by the driver, $F_{xDR}$, which is a sum of a deceleration braking force $F_{xBR}$ imparted to the right wheel side (right front wheel FW2 and the right rear wheel RW2) and the left-wheel-side forward/backward force $F_{xDR}$ calculated in Step S15, in accordance with the following Equation 13.

$$F_{xDR}=F_{xBR}+F_{xCR} \qquad \text{Equation 13}$$

Note that, the electronic control unit 33 receives, as an input, the brake hydraulic pressure in the wheel cylinders Wfr and Wrr from the pressure gauges (not shown), which are provided respectively for the FR brake hydraulic pressure adjustment unit 22 and the RR brake hydraulic pressure adjustment unit 25. Then, the electronic control unit 33 calculates, by using the detected brake hydraulic pressures, based on the relationship set in advance respectively between the brake hydraulic pressures in the wheel cylinders Wfr and Wrr and the braking forces, the deceleration braking force $F_{xBR}$.

Then, in Step S24, the electronic control unit 33 determines whether or not the sum $F_{xDR}$ on the left wheel side calculated in Step S23 is larger than "0", namely, the sum $F_{xDR}$ is a positive value. Specifically, when the sum $F_{xDR}$ is larger than "0", namely, is a positive value, the electronic control unit 33 determines as "Yes", and proceeds to Step S25. On this occasion, the case where the sum $F_{xDR}$ is a positive value is a case where the deceleration braking force $F_{xBR}$ (negative value: braking force) is smaller than the right-wheel-side forward/backward force $F_{xCR}$ (positive value: driving force), namely, the vehicle 10 is turning to the left direction, and the target yaw moment $M_y$ is calculated as a positive value.

On the other hand, when the sum $F_{xDR}$ is equal to or less than "0", namely, the sum $F_{xDR}$ is "0" or a negative value, the electronic control unit 33 determines as "No", and proceeds to Step S26. On this occasion, the case where the sum $F_{xDR}$ is "0" or a negative value is a case where the absolute value of the right-wheel-side forward/backward force $F_{xCR}$ is equal to or less than the absolute value of the deceleration braking force $F_{xBR}$ (negative value: braking force). In other words, the above-mentioned case is a case where the vehicle 10 is turning toward the right direction and the target yaw moment $M_y$ is calculated as a negative value, or a case where the vehicle 10 is turning toward the left direction and the target yaw moment $M_y$ is calculated as a small positive value.

In Step S25, as in Step S22, the electronic control unit 33 calculates a final right-wheel-side forward/backward force $F_{xR}$ as "0", and calculates a final left-wheel-side forward/backward force $F_{xL}$ according to the following Equation 14.

$$F_{xL}=F_{xBL}+F_{xCL}-F_{xDR} \qquad \text{Equation 14}$$

In Step S26, the electronic control unit 33 calculates the final right-wheel-side forward/backward force $F_{xR}$ and the final left-side forward/backward force $F_{xR}$ according to the following Equation 15.

$$F_{xR} = F_{xBR} + F_{xCR} \qquad \text{Equation 15}$$
$$F_{xL} = F_{xBL} + F_{xCL}$$

On this occasion, the processing in Step S26 is carried out when the determination "No" is made both in Step S21 and Step S24. In other words, the state in which Step S26 is carried out is the case where, by increasing/decreasing the deceleration braking force $F_{xBR}$ and the deceleration braking force $F_{xBL}$ in accordance with the turn direction of the vehicle 10, the right-wheel-side forward/backward force $F_{xCR}$ and the left-wheel-side forward/backward force $F_{xCL}$ can be generated, thereby generating the target yaw moment $M_y$. Thus, in this case, the electronic control unit 33 calculates, in accordance with Equation 15, the final right-wheel-side forward/backward force $F_{xR}$ (=sum $F_{xDR}$) and the final left-side forward/backward force $F_{xL}$ (=sum $F_{xDL}$).

In this way, after the final left-side forward/backward force $F_{xL}$ and the final right-wheel-side forward/backward force $F_{xR}$ are calculated, in Step S16, the electronic control unit 33 once finishes the execution of the yaw moment control program. Then, after an elapse of a predetermined short period, in Step S10, the electronic control unit 33 starts the execution of the program.

The electronic control unit 33 calculates, by executing the above-mentioned yaw moment control program, the final left-side forward/backward force $F_{xL}$ and the final right-wheel-side forward/backward force $F_{xR}$, and then generates the final left-side forward/backward force $F_{xL}$ on the left wheel side (left front wheel FW1 and left rear wheel RW1), and the final right-wheel-side forward/backward force $F_{xR}$ on the right wheel side (right front wheel FW2 and right rear wheel RW2). Specifically, according to the second embodiment, the electronic control unit 33 controls, via the drive circuit 34, the operations of the linear control valve PC1, the linear control valve PC2, the FR brake hydraulic pressure adjustment unit 22, the FL brake hydraulic pressure adjustment unit 23, the RL brake hydraulic pressure adjustment unit 24, the RR brake hydraulic pressure adjustment unit 25, and the back flow brake fluid feed unit 26 of the brake hydraulic pressure control unit 20.

As a result, the electronic control unit 33 can select whether or not to generate, on the left wheel side, the braking force coincident with the final left-side forward/backward force $F_{xL}$, and can select whether or not to generate, on the right wheel side, the braking force coincident with the final right-side-wheel forward/backward force $F_{xR}$, thereby generating the target yaw moment $M_y$ toward the left direction or the target yaw moment $M_y$ toward the right direction on the vehicle 10.

As can be understood from the description given above, according to the second embodiment, the electronic control unit 33 can generate, by using braking forces only on the left wheel side or the right wheel side, the appropriate target yaw moment $M_y$ on the vehicle 10. As a result, as in the first embodiment and the modified example, the frequency response characteristic of the yaw rate γ generated on the vehicle 10 can be approximately constant, and the directional stability and the responsiveness can be extremely appropriately maintained. Thus, more satisfactory directional stability and responsiveness during the vehicle turn can be acquired, and, regarding the change in the yaw rate γ generated on the vehicle 10, the sense of discomfort felt by a driver can be significantly restrained.

Embodiments of the present invention are not limited to the embodiments and the modified example described above, and may be changed in various ways without departing from the object of the present invention.

Figure 11A:
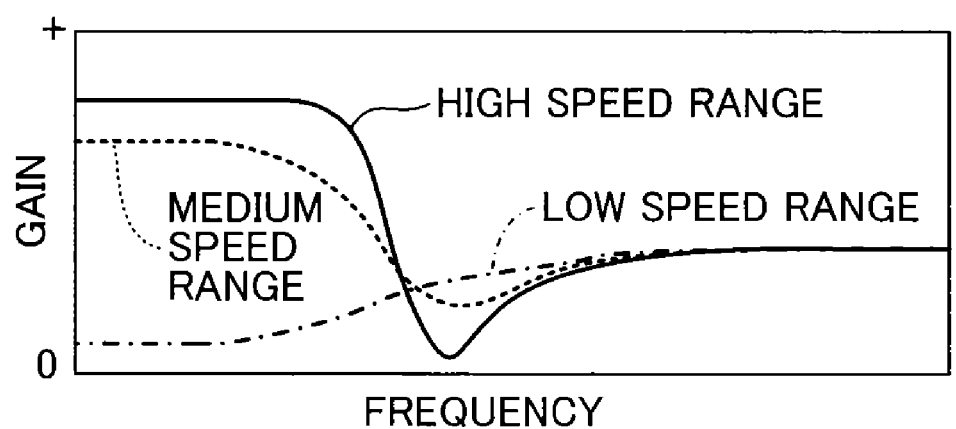
FIG. 11A A graph showing the frequency response characteristic of a lateral acceleration generated on the vehicle in response to a frequency change of the steering angle according to a modified example of the present invention.

For example, according to the embodiments and the modified example, in order to restrain the change in the transient response characteristic (frequency response characteristic) of the yaw rate γ as the motion state amount of the vehicle, to secure the directional stability of the vehicle in the high speed range, and to improve the response lag in the low speed range, the left-wheel-side forward/backward force $F_{xCL}$ (final left-side forward/backward force $F_{xL}$) and the right-wheel-side forward/backward force $F_{xCR}$ (final right-wheel-side forward/backward force $F_{xR}$) for generating the target yaw moment $M_y$ are calculated. By the way, as shown in FIG. 11A, on a conventional vehicle, the gain (amplitude ratio) of the lateral acceleration as a motion state amount with respect to the frequency change of the actual wheel turning angle δ has a tendency to be approximately constant when the frequency is low and decrease as the frequency increases in the medium and high speed ranges, and has a tendency to increase as the frequency increases in the low speed range.

Figure 11B:
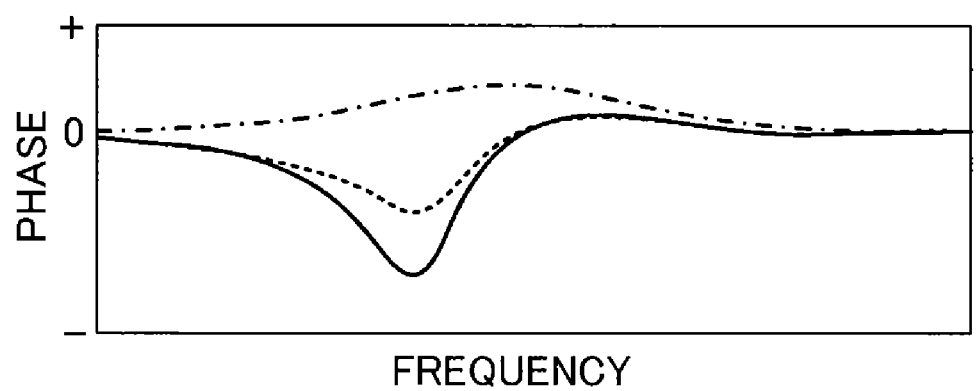
FIG. 11B A graph showing a frequency response characteristic of the lateral acceleration generated on the vehicle in response to the frequency change of the steering angle according to the modified example of the present invention.

Moreover, as shown in FIG. 11B, on the conventional vehicle, the phase angle of the lateral acceleration with respect to the frequency change of the actual wheel turning angle δ has a tendency, in the medium and high speed ranges, that the phase lag once increases as the frequency increases, and, thereafter, becomes approximately "0", and has a tendency, in the low speed range, that the phase advance once increases as the frequency increases, and, thereafter, becomes approximately "0".

As a result of those frequency response characteristics, mainly in the low speed range, due to the increase in gain and the advance in phase in the high frequency range, the vehicle tends to travel on an inner side of the intended trajectory of the driver, and the driver feels the sense of discomfort that the vehicle quickly turns toward the inside as a result of the turn operation of the steering wheel 13. Moreover, mainly in the high speed range, the gain tends to significantly decrease, and the phase lag tends to increase. Thus, the generation of the lateral acceleration caused by a turn operation of the steering wheel 13 lags, and the driver feels the sense of discomfort.

As a result, by using the following Equation 16 representing a relationship between the yaw rate γ and a lateral acceleration $a_{gy}$ generated during the vehicle turn, the electronic control unit 33 calculates the lateral acceleration $a_{gy}$ by transforming Equations 3 and 4, calculates a lateral acceleration $a_{gyc}$ in the steady state corresponding to Equation 5 by using the transformed Equation 4, calculates a transfer function corresponding to Equation 7 which establishes $a_{gy}=a_{gyc}$, receives the wheel turning speed ω as an input, and outputs the target yaw moment.

$$a_{gy} = V\left(\frac{d\beta}{dt} + \gamma\right) \quad \text{Equation 16}$$

Then, the electronic control unit 33 calculates, as in the embodiments and the modified example, by using the calculated transfer function and the wheel turning speed ω, the target yaw moment, and calculates the left-wheel-side forward/backward force $F_{xCL}$ (final left-side forward/backward force $F_{xL}$) and the right-wheel-side forward/backward force $F_{xCR}$ (final right-wheel-side forward/backward force $F_{xR}$).

Figure 12A:
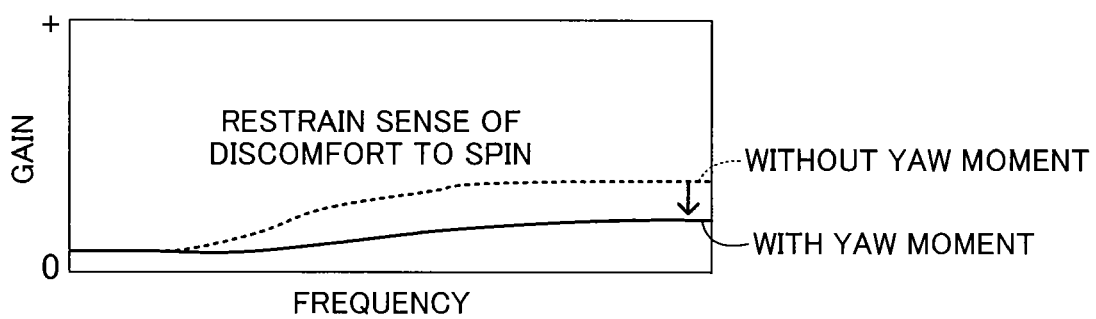
FIG. 12A An explanatory graph showing a change in the frequency response characteristic of the lateral acceleration generated on the vehicle when the target yaw moment is generated.
Figure 12B:
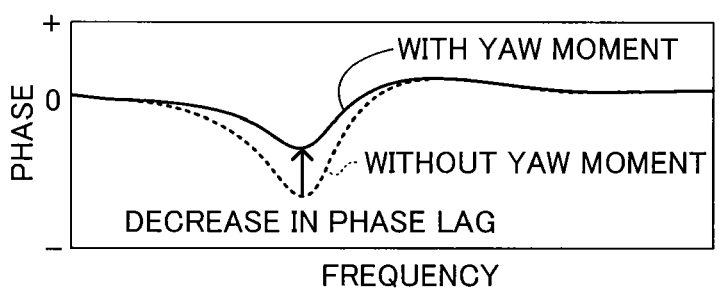
FIG. 12B An explanatory graph showing a change in the frequency response characteristic of the lateral acceleration generated on the vehicle when the target yaw moment is generated.

As a result, as shown in FIGS. 12A and 12B, a change in a frequency response characteristic of the lateral acceleration $a_{gy}$ generated on the vehicle, specifically, a change in the response characteristic of the gain of the lateral acceleration $a_{gy}$ can be restrained. In other words, in this case, the frequency response characteristic of the lateral acceleration $a_{gy}$ generated on the vehicle can be approximately constant, and the directional stability and the responsiveness can be extremely appropriately maintained. Thus, satisfactory directional stability and responsiveness during the vehicle turn can be acquired, and, regarding the change in the lateral acceleration $a_{gy}$ generated on the vehicle, the sense of discomfort felt by a driver can be more significantly restrained.

Moreover, according to the first embodiment, the left-wheel-side forward/backward force $F_{xCL}$ and the right-wheel-side forward/backward force $F_{xCR}$ are respectively divided into equal two parts, the equally halved left-wheel-side forward/backward force $F_{xCL}/2$ is generated respectively on the left front wheel FW1 and left rear wheel RW1, and the equally halved right-wheel-side forward/backward force $F_{xCR}/2$ is generated respectively on the right front wheel FW2 and right rear wheel RW2. In this case, the distribution (ratio) between the left-wheel-side forward/backward force $F_{xCL}$ and the right-wheel-side forward/backward force $F_{xCR}$ is not limited to this case, and it should be understood that, for example, the distribution (ratio) to the front wheel side may be increased, or the left-wheel-side forward/backward force $F_{xCL}$ and the right-wheel-side forward/backward force $F_{xCR}$ may be generated only on the left and right front wheels FW1 and FW2.

Moreover, according to the first embodiment and the modified example, the braking forces are imparted to the turning-inner-wheel side, and the driving forces are imparted to the turning-outer-wheel side. In this case, it should be understood that it is possible to just impart the braking forces to the turning-inner-wheel side or just impart the driving forces to the turning-outer-wheel side is possible.

Moreover, according to the second embodiment, the target yaw moment $M_y$ is generated by using only the braking forces. In this case, conversely, by using only the braking force, the target yaw moment $M_y$ can be generated. In other words, in this case, in order to generate a difference in driving force between the left wheel side and the right wheel side thereby generating the target yaw moment $M_y$, the electronic control unit 33 may control to drive the respective in-wheel motors IWMfl, IWMfr, IWMrl, and IWMrr so that the driving forces on the turning-outer-wheel side become large.

Moreover, according to the first embodiment and the modified example, the respective in-wheel motors IWMfl, IWMfr, IWMrl, and IWMrr provided in the left and right front wheels FW1 and FW2 and the left and right rear wheels RW1 and RW2 generate the driving forces coincident with the left-wheel-side forward/backward forces $F_{xCL}$ and the right-wheel-side forward/backward forces $F_{xCR}$. In this case, in place of the driving forces by the respective in-wheel motors IWMfl, IWMfr, IWMrl, and IWMrr, by adjusting the output of the engine installed on the vehicle 10, the driving forces coincident with the left-wheel-side forward/backward forces $F_{xCL}$ and the right-wheel-side forward/backward forces $F_{xCR}$ can be generated.

Further, according to the embodiments and the modified example, the brake units 14 to 17 are provided on the left and right front wheels FW1 and FW2 and the left and right rear wheels RW1 and RW2, and, by the brake hydraulic pressure control by the brake hydraulic pressure control unit 20, the braking forces are generated. In this case, the electronic control unit 33 can generate, by controlling to brake the respective in-wheel motors IWMfl, IWMfr, IWMrl, and IWMfr provided in the left and right front wheels FW1 and FW2 and the left and right rear wheels RW1 and RW2, braking forces on the left and right front wheels FW1 and FW2, and the left and right rear wheels RW1 and RW2.

The invention claimed is:

1. A vehicle behavior control device for controlling a behavior during a turn of a vehicle including a steering wheel operated by a driver for steering the vehicle and wheel turning means for turning a wheel to be turned in accordance with the operation of the steering wheel, the vehicle behavior control device comprising:
   wheel turning speed detection means for detecting a wheel turning speed of the wheel to be turned by the wheel turning means;
   vehicle speed detection means for detecting a vehicle speed of the vehicle;
   transfer function determination means for determining, by using the vehicle speed detected by the vehicle speed detection means, a transfer function which is determined based on a specification of the vehicle, receives the wheel turning speed of the wheel to be turned as an input, and outputs a yaw moment for making constant a frequency response characteristic of a motion state amount generated on the vehicle by the turning of the wheel to be turned by the wheel turning means in response to a periodic turn of the wheel to be turned;
   target yaw moment calculation means for calculating, by using the transfer function determined by the transfer function determination means and the wheel turning speed detected by the wheel turning speed detection means, a target yaw moment to be generated in a wheel turning direction of the wheel to be turned;
   forward/backward force calculation means for calculating, by using the target yaw moment calculated by the target yaw moment calculation means, a left-wheel-side forward/backward force to be generated on a left wheel side of front/rear left/right wheels of the vehicle, and a right-wheel-side forward/backward force to be generated on a right wheel side of the front/rear left/right wheels of the vehicle;
   forward/backward force imparting means for imparting the left-wheel-side forward/backward force calculated by the forward/backward force calculation means to the left wheel side of the vehicle, and imparting the right-wheel-side forward/backward force calculated by the forward/backward force calculation means to the right wheel side of the vehicle; and
   operation direction detection means for detecting an operation direction of the steering wheel operated by the driver,
   wherein, in a state in which the vehicle in a turning state is decelerating by a decelerating braking force imparted to the front/rear left/right wheels, when the decelerating braking force imparted to the right wheel side or the left wheel side corresponding to a turning-outer-wheel side of the vehicle in the turning state is smaller than the right-wheel-side forward/backward force or the left-wheel-side forward/backward force corresponding to the turning-outer-wheel side of the vehicle in the turning state for generating the target yaw moment calculated by the target yaw moment calculation means, the forward/backward force calculation means adds a difference between the deceleration braking force and the right-wheel-side forward/backward force or the left-wheel-side forward/backward force corresponding to the turning-outer-wheel side of the vehicle to the left-wheel-side forward/backward force or the right-wheel-side forward/backward force corresponding to a turning-inner-wheel side of the vehicle in the turning state to calculate a sum as a final left-wheel-side forward/backward force or right-wheel-side forward/backward force corresponding to the turning-inner-wheel side of the vehicle, and
   when a generated direction of a motion state amount generated on the vehicle correspondingly to the operation direction of the steering wheel detected by the operation direction detection means and a generated direction of a motion state amount generated on the vehicle by the left-wheel-side forward/backward force and the right-wheel-side forward/backward force are different from each other, the forward/backward force calculation means calculates the left-wheel-side forward/backward force and the right-wheel-side forward/backward force as "0".

2. A vehicle behavior control device according to claim 1, wherein:
   the forward/backward force calculation means calculates, as a braking force, depending on the wheel turning direction of the wheel to be turned by the wheel turning means, the left-wheel-side forward/backward force or the right-wheel-side forward/backward force corresponding to a turning-inner-wheel side of the vehicle in a turning state, and calculates, as a driving force, the right-wheel-side forward/backward force or the left-wheel-side forward/backward force corresponding to a turning-outer-wheel side of the vehicle in the turning state; and
   the forward/backward force imparting means imparts the braking force or the driving force to the left wheel side, and imparts the driving force or the braking force to the right wheel side.

3. A vehicle behavior control device according to claim 2, wherein the forward/backward force imparting means imparts the braking force or the driving force to a rear wheel on the left wheel side, or imparts the driving force or the braking force to a rear wheel on the right wheel side.

4. A vehicle behavior control device according to claim 1, wherein:
the forward/backward force calculation means calculates, as a braking force, depending on the wheel turning direction of the wheel to be turned by the wheel turning means, the left-wheel-side forward/backward force or the right-wheel-side forward/backward force corresponding to a turning-inner-wheel side of the vehicle in a turning state; and
the forward/backward force imparting means imparts the braking force to the left wheel side or the right wheel side corresponding to the turning-inner-wheel side of the vehicle.

5. A vehicle behavior control device according to claim 1, wherein:
the forward/backward force calculation means calculates, as a driving force, depending on the wheel turning direction of the wheel to be turned by the wheel turning means, the right-wheel-side forward/backward force or the left-wheel-side forward/backward force corresponding to a turning-outer-wheel side of the vehicle in a turning state; and
the forward/backward force imparting means imparts the driving force to the right wheel side or the left wheel side corresponding to the turning-outer-wheel side of the vehicle.

6. A vehicle behavior control device according to claim 1, wherein the forward/backward force calculation means calculates the final right-wheel-side forward/backward force or left-wheel-side forward/backward force corresponding to the turning-outer-wheel side of the vehicle as "0".

7. A vehicle behavior control device according to claim 1, wherein:
the target yaw moment calculation means sets, when the operation direction of the steering wheel detected by the operation direction detection means and a generated direction of the calculated target yaw moment are different from each other, the calculated target yaw moment to "0"; and
the forward/backward force calculation means calculates, by using the target yaw moment set to "0" by the target yaw moment calculation means, the left-wheel-side forward/backward force and the right-wheel-side forward/backward force as "0".

8. A vehicle behavior control device according to claim 1, wherein the forward/backward force imparting means comprises:
braking force imparting means for imparting a braking force to each of the front/rear left/right wheels of the vehicle; and
driving force imparting means for imparting a driving force to the each of the front/rear left/right wheels of the vehicle.

9. A vehicle steering device according to claim 1, wherein the frequency response characteristic in response to the periodic turn of the wheel to be turned includes response characteristics of a gain and a phase of the motion state amount generated on the vehicle in response to a frequency change of an amount of turn of the wheel to be turned.

10. A vehicle steering device according to claim 1, wherein the motion state amount generated on the vehicle is a yaw rate of the vehicle or a lateral acceleration of the vehicle.

* * * * *